(12) United States Patent
So et al.

(10) Patent No.: US 10,291,765 B2
(45) Date of Patent: May 14, 2019

(54) MOBILE DEVICE, ROBOT CLEANER, AND METHOD FOR CONTROLLING THE SAME

(71) Applicant: Samsung Electronics Co., Ltd, Gyeonggi-do (KR)

(72) Inventors: Jea Yun So, Gyeonggi-do (KR); Jin Hee Kim, Incheon (KR); Sang Sik Yoon, Gyeonggi-do (KR); Shin Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 15/314,506

(22) PCT Filed: May 28, 2015

(86) PCT No.: PCT/KR2015/005346
§ 371 (c)(1),
(2) Date: Nov. 28, 2016

(87) PCT Pub. No.: WO2015/183005
PCT Pub. Date: Dec. 3, 2015

(65) Prior Publication Data
US 2017/0201617 A1    Jul. 13, 2017

(30) Foreign Application Priority Data

May 28, 2014    (KR) ........................ 10-2014-0064205

(51) Int. Cl.
| | |
|---|---|
| *H04M 1/725* | (2006.01) |
| *G05D 1/00* | (2006.01) |
| *H04Q 9/00* | (2006.01) |
| *G08C 17/02* | (2006.01) |
| *A47L 11/24* | (2006.01) |
| *A47L 11/40* | (2006.01) |

(52) U.S. Cl.
CPC ......... *H04M 1/72533* (2013.01); *A47L 11/24* (2013.01); *A47L 11/4011* (2013.01);
(Continued)

(58) Field of Classification Search
CPC . H04M 1/72533; A47L 11/4011; A47L 11/24; A47L 2201/04; A47L 2201/00;
(Continued)

(56) References Cited

U.S. PATENT DOCUMENTS

| | | |
|---|---|---|
| 2008/0082208 A1 | 4/2008 | Hong et al. |
| 2010/0094537 A1 | 4/2010 | Goto et al. |
| (Continued) | | |

FOREIGN PATENT DOCUMENTS

| | | |
|---|---|---|
| CN | 103784079 A | 5/2014 |
| KR | 100821162 | 4/2008 |
| (Continued) | | |

OTHER PUBLICATIONS

International Search Report dated Sep. 11, 2015 in connection with International Application No. PCT/KR2015/005346, 3 pages.
(Continued)

*Primary Examiner* — Adam R Mott

(57) ABSTRACT

The present disclosure discloses a mobile device, cleaning robot, and method for controlling the cleaning robot. The mobile device includes a capturing unit; a display for displaying an image of a cleaning robot obtained from the capturing unit and receiving a touch; and a controller for controlling the cleaning robot to move to a location that corresponds to the input touch.

17 Claims, 28 Drawing Sheets

(52) U.S. Cl.
CPC ......... *G05D 1/0016* (2013.01); *G05D 1/0033* (2013.01); *G08C 17/02* (2013.01); *H04Q 9/00* (2013.01); *A47L 2201/00* (2013.01); *A47L 2201/04* (2013.01); *G05D 2201/0203* (2013.01); *G05D 2201/0215* (2013.01); *G08C 2201/30* (2013.01); *G08C 2201/34* (2013.01); *G08C 2201/93* (2013.01)

(58) Field of Classification Search
CPC ............... G05D 1/0016; G05D 1/0033; G05D 2201/0215; G05D 2201/0203; G08C 17/02; G08C 2201/93; G08C 2201/30; G08C 2201/34; H04Q 9/00
See application file for complete search history.

(56) References Cited

U.S. PATENT DOCUMENTS

| | | |
|---|---|---|
| 2013/0056032 A1 | 3/2013 | Choe et al. |
| 2013/0060379 A1 | 3/2013 | Choe et al. |
| 2013/0194418 A1* | 8/2013 | Gonzalez-Banos .... G01C 11/02 348/135 |
| 2014/0116469 A1* | 5/2014 | Kim ..................... A47L 9/2894 134/18 |

FOREIGN PATENT DOCUMENTS

| | | |
|---|---|---|
| KR | 1020130074902 | 7/2013 |
| WO | 2013085085 A1 | 6/2013 |

OTHER PUBLICATIONS

Written Opinion of the International Searching Authority dated Sep. 11, 2015 in connection with International Application No. PCT/KR2015/005346, 9 pages.

European Patent Office, "Supplementary European Search Report," Application No. EP 15800141.2, dated Feb. 1, 2018, 7 pages.

Communication from a foreign patent office in a counterpart foreign application, State Intellectual Property Office of the People's Republic of China, "Notification of the First Office Action," Application No. CN 201580028102.7, dated Jul. 4, 2018, 13 pages.

* cited by examiner

[Fig. 1]
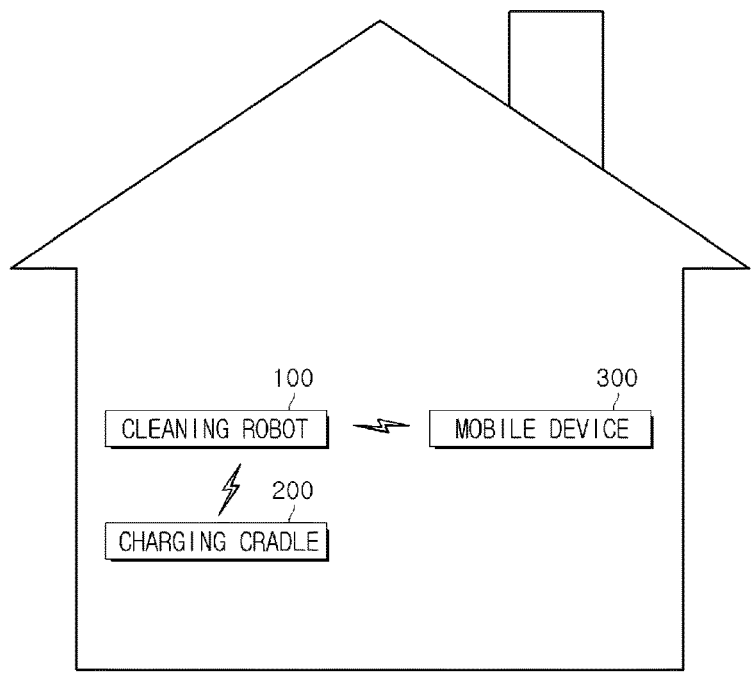
[Fig. 2]
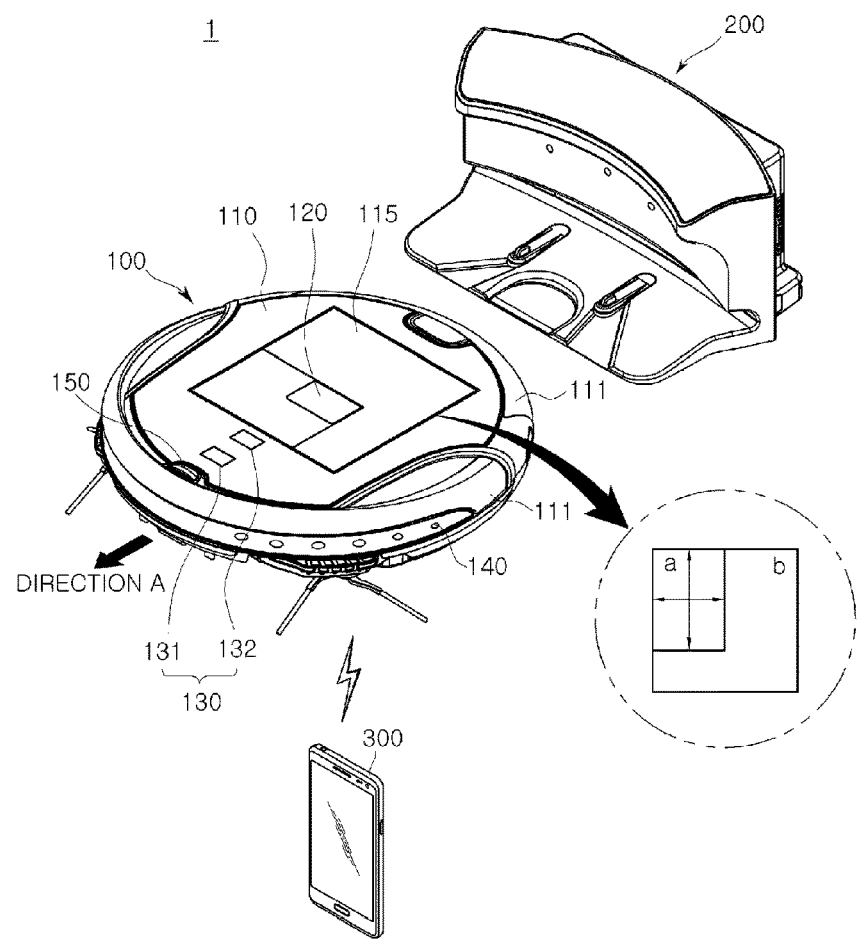

[Fig. 3]
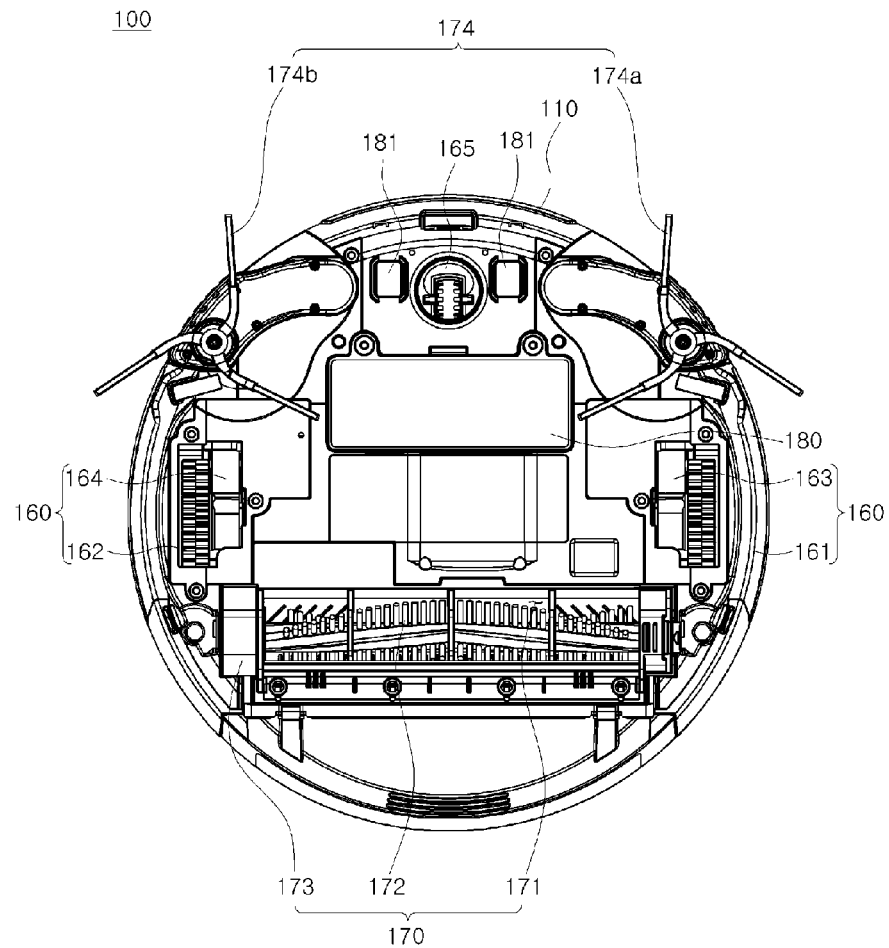
[Fig. 4]
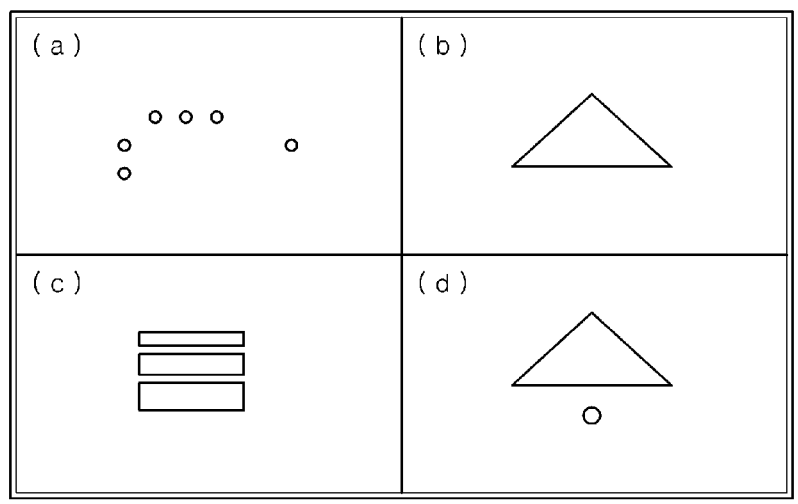

[Fig. 5]
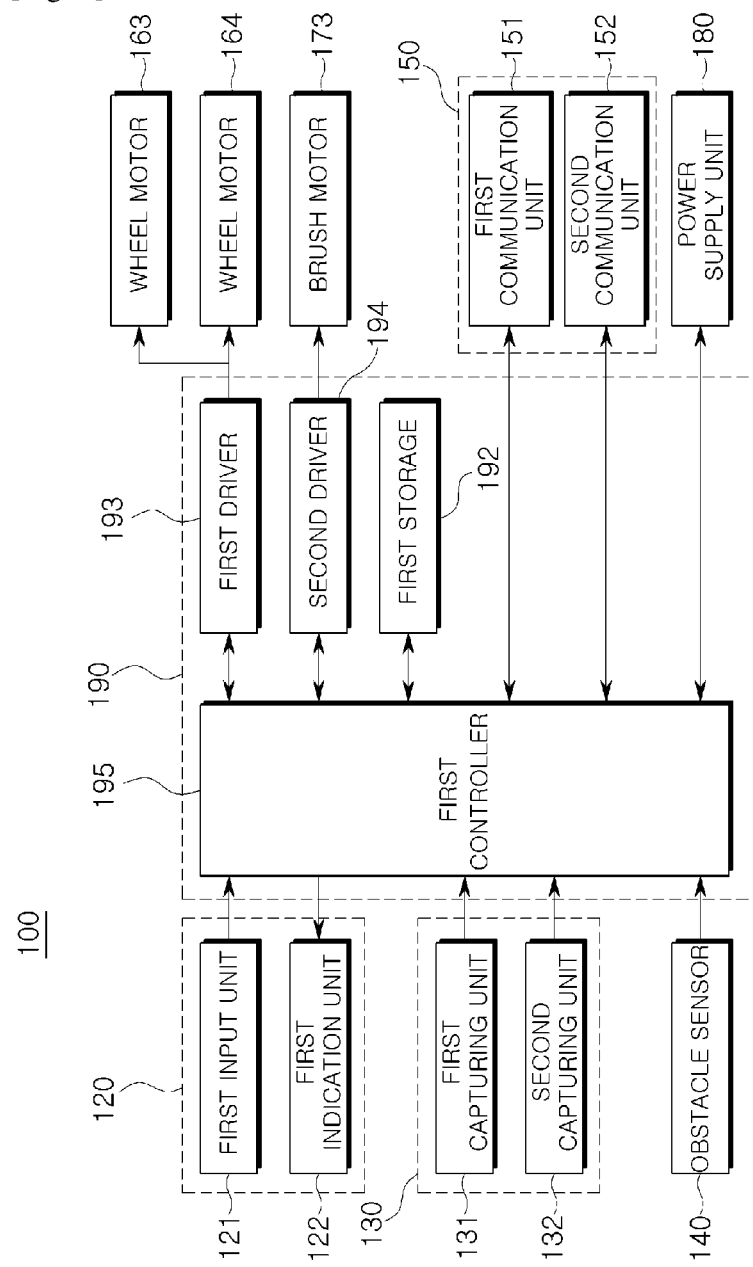

[Fig. 6]
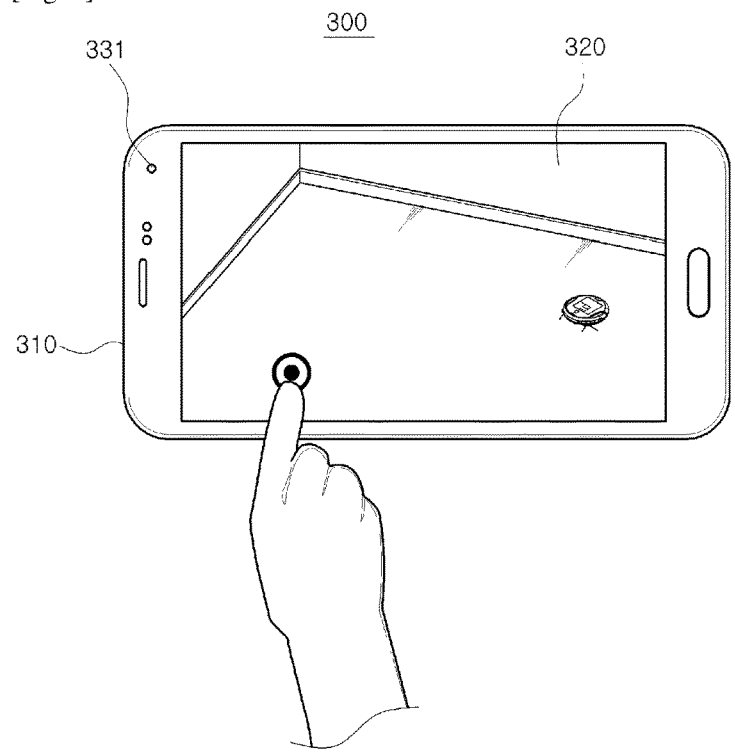
[Fig. 7a]
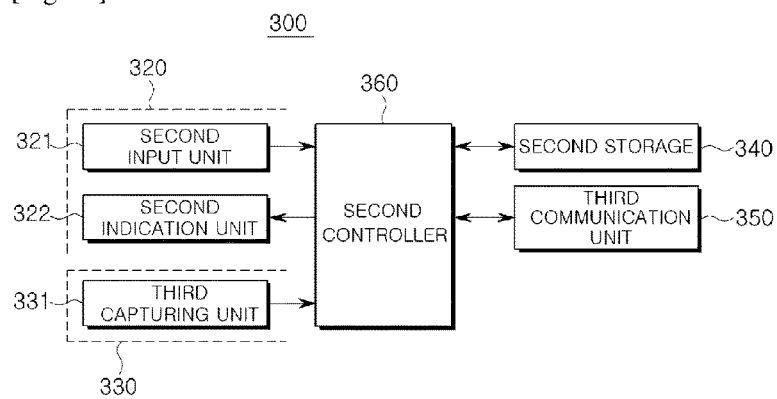
[Fig. 7b]
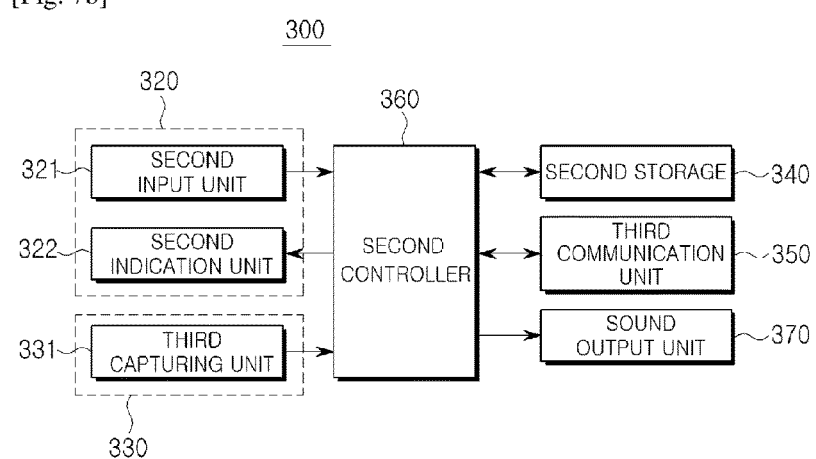

[Fig. 8]
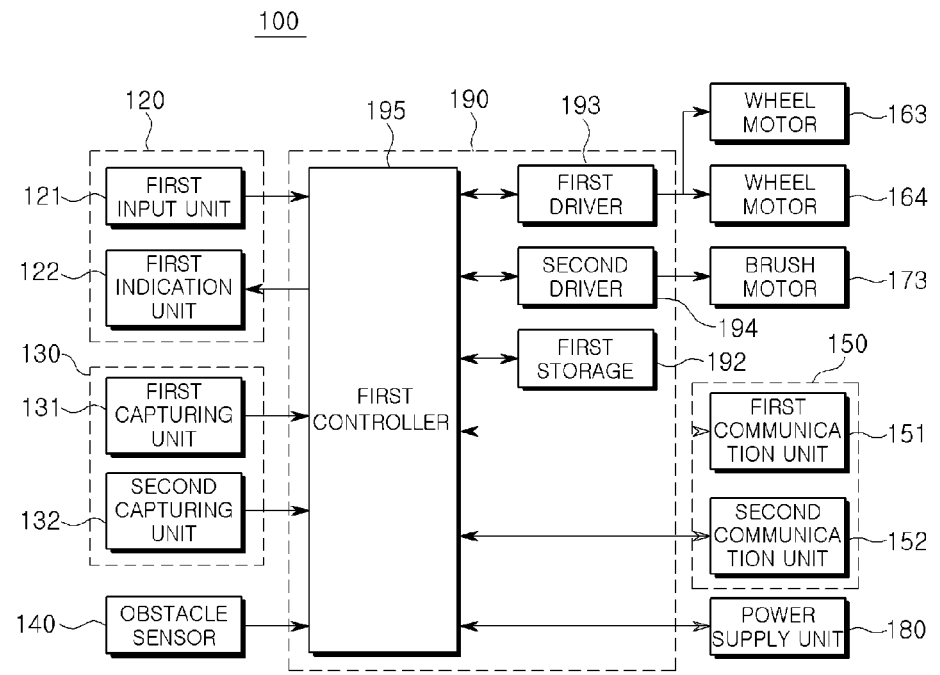
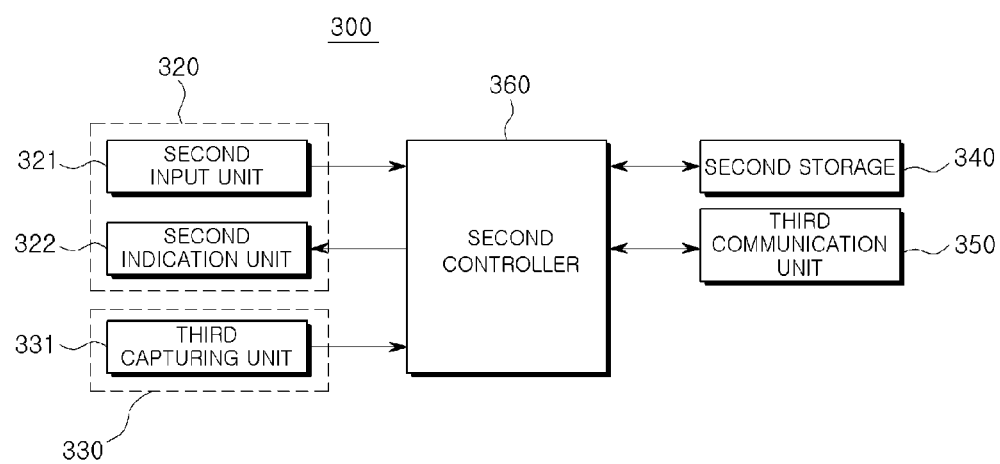

[Fig. 9]
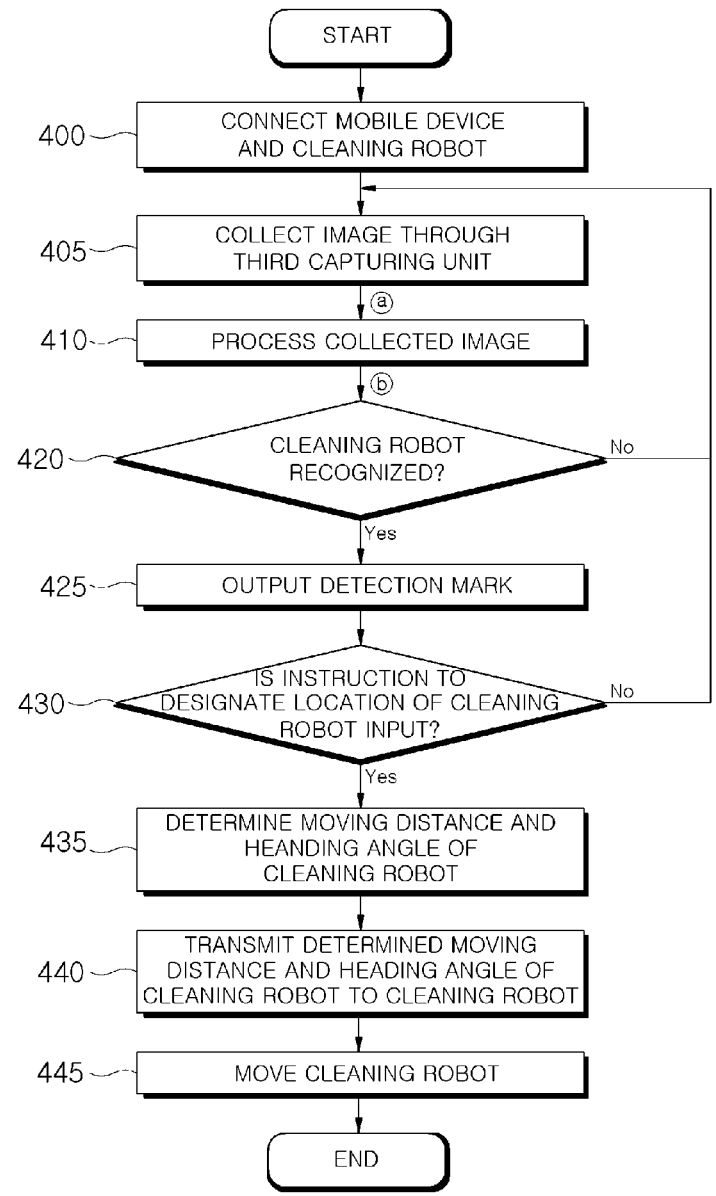

[Fig. 10]
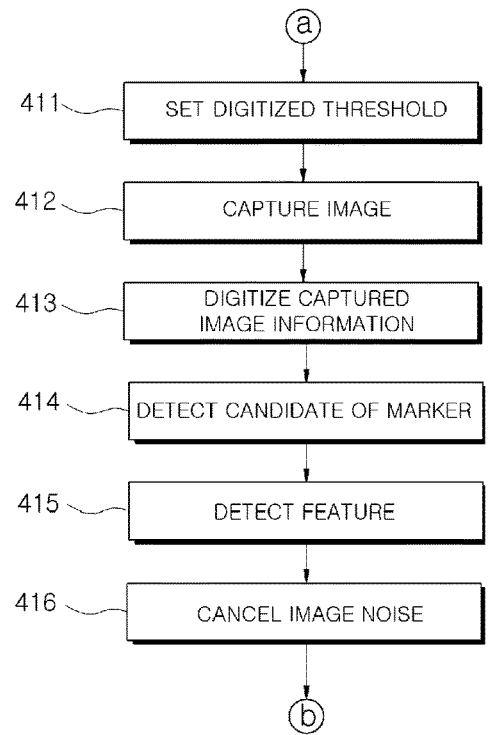
[Fig. 11a]
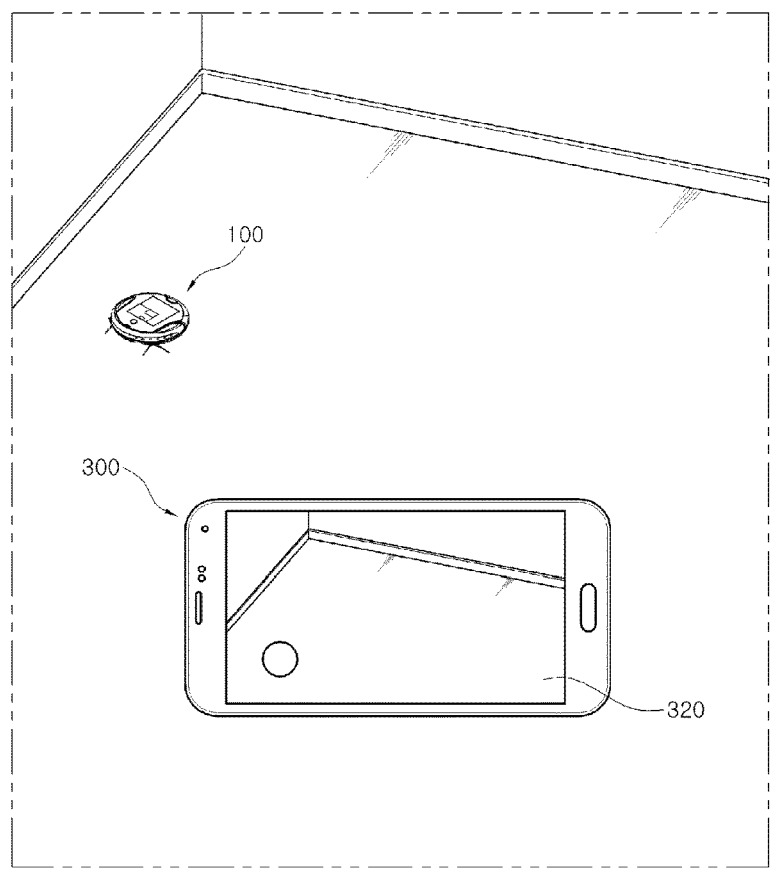

[Fig. 11b]
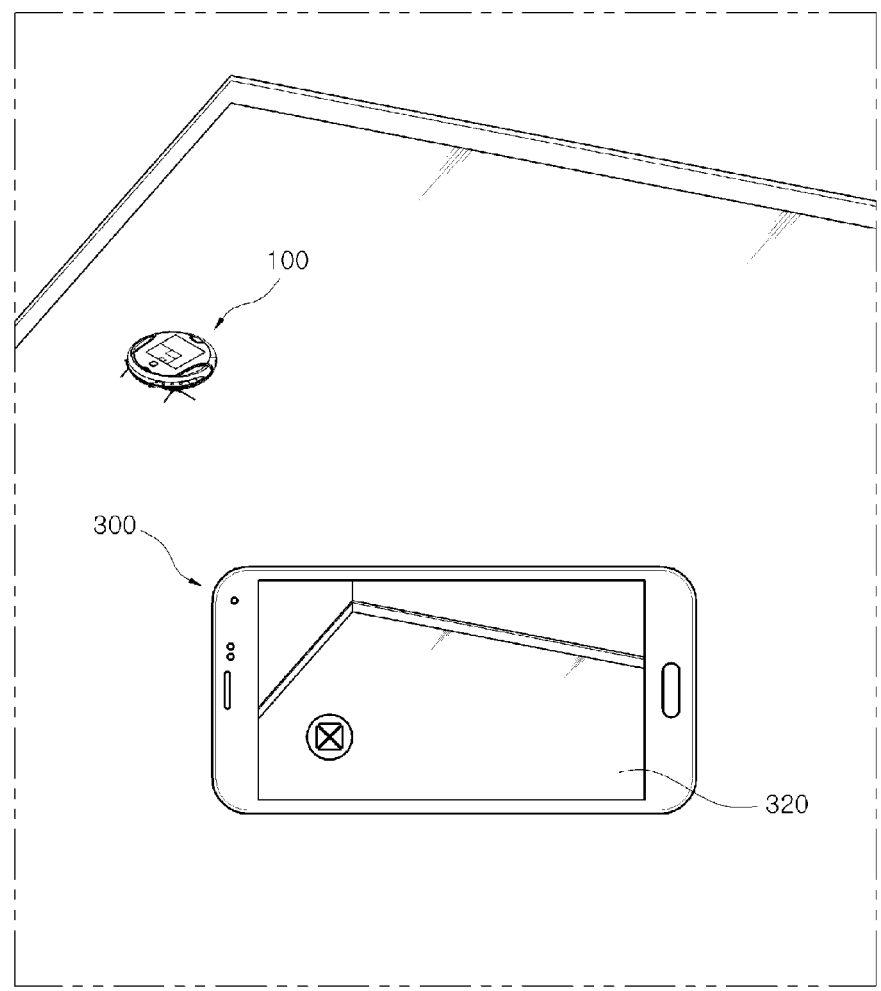

[Fig. 11c]
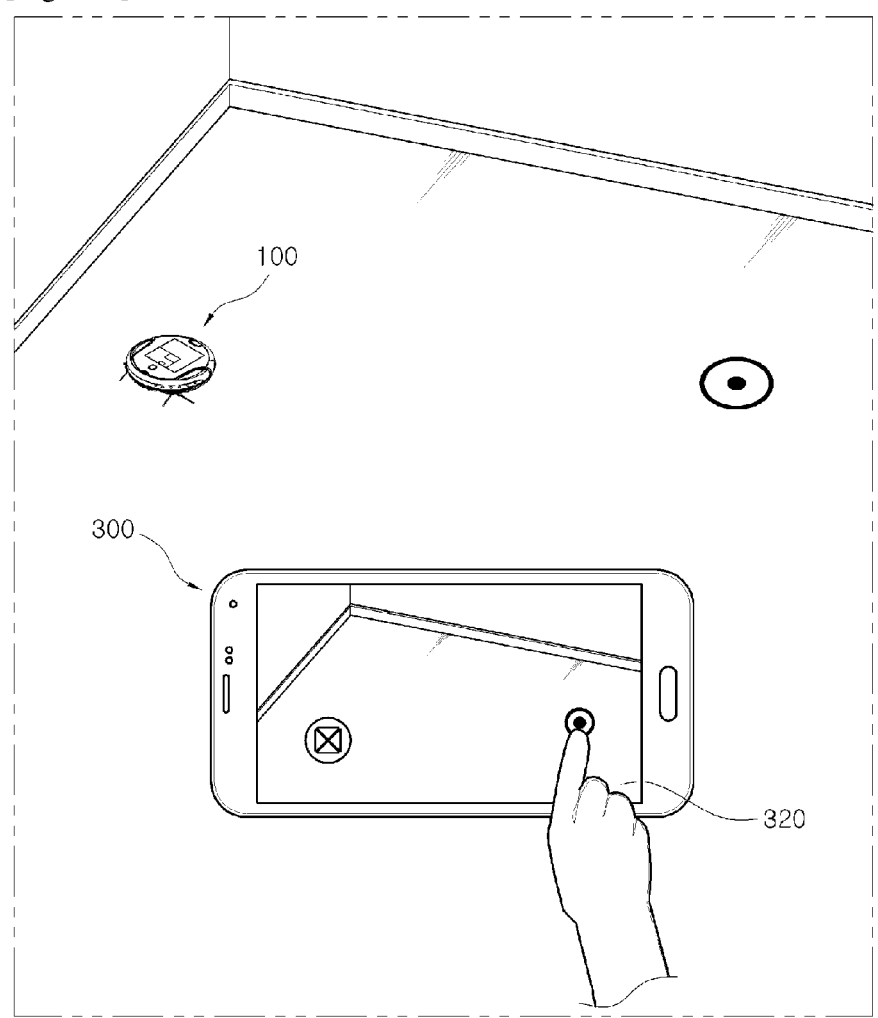

[Fig. 11d]
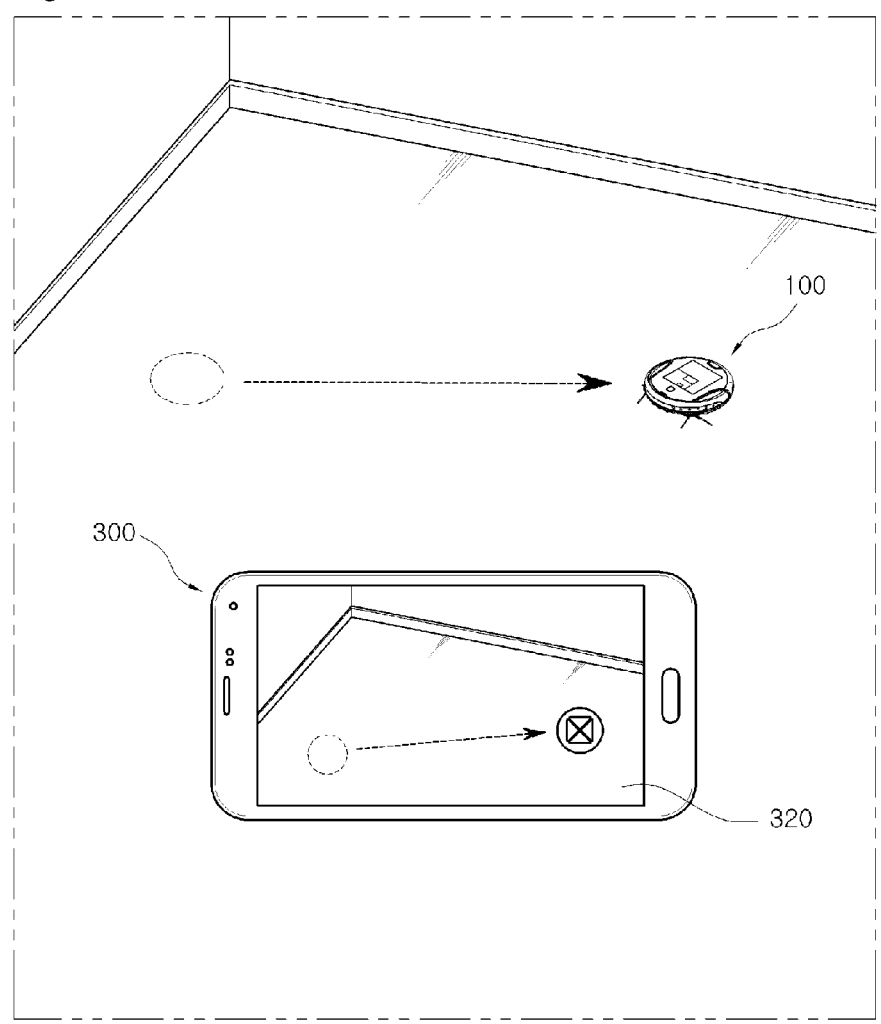

[Fig. 12a]
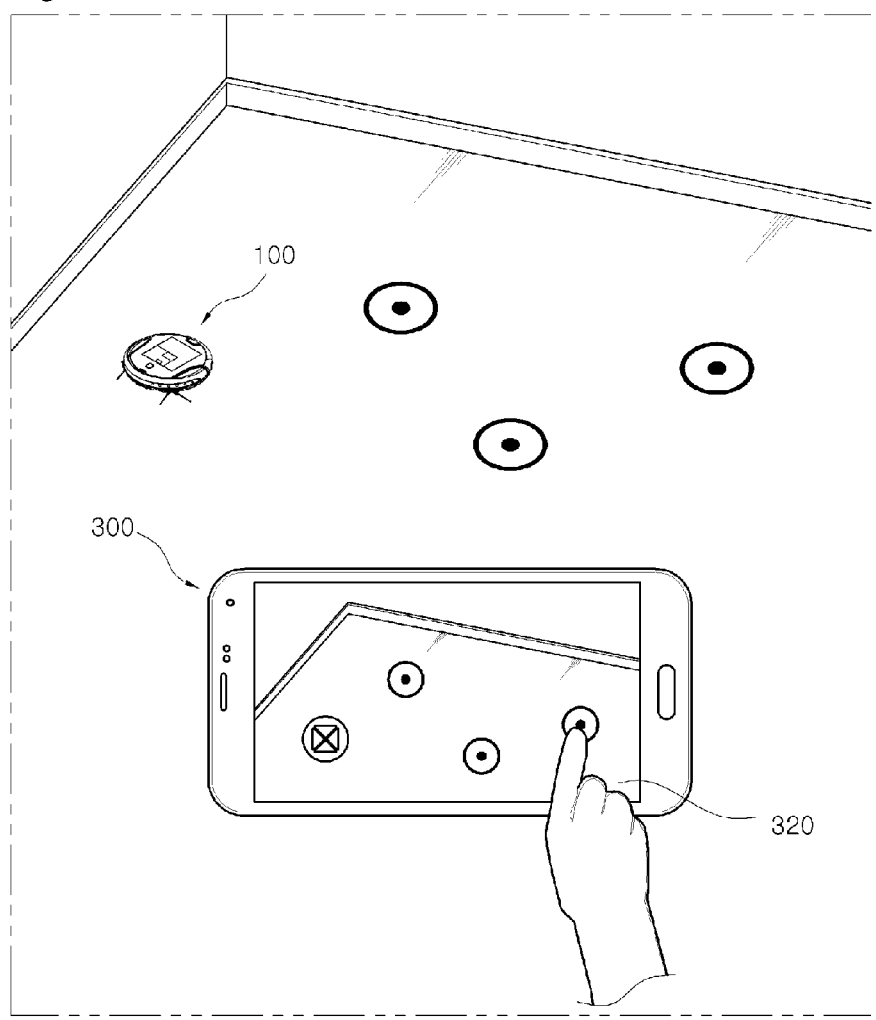

[Fig. 12b]
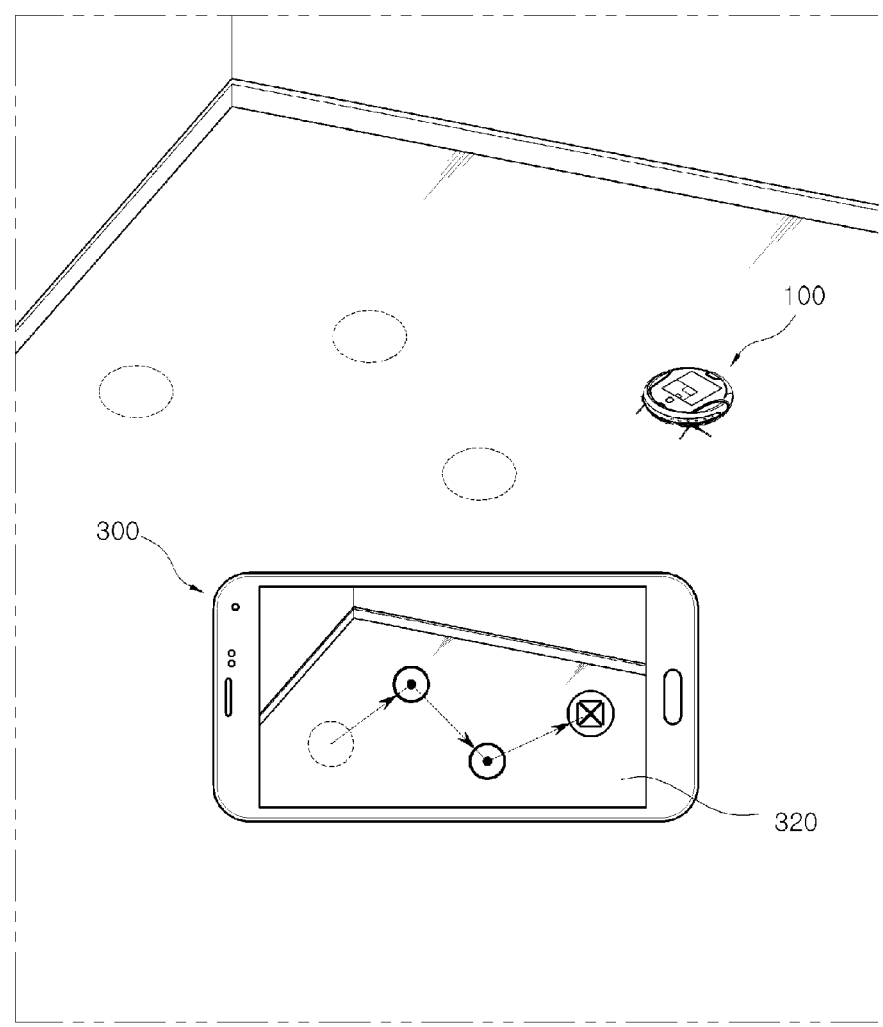

[Fig. 13a]
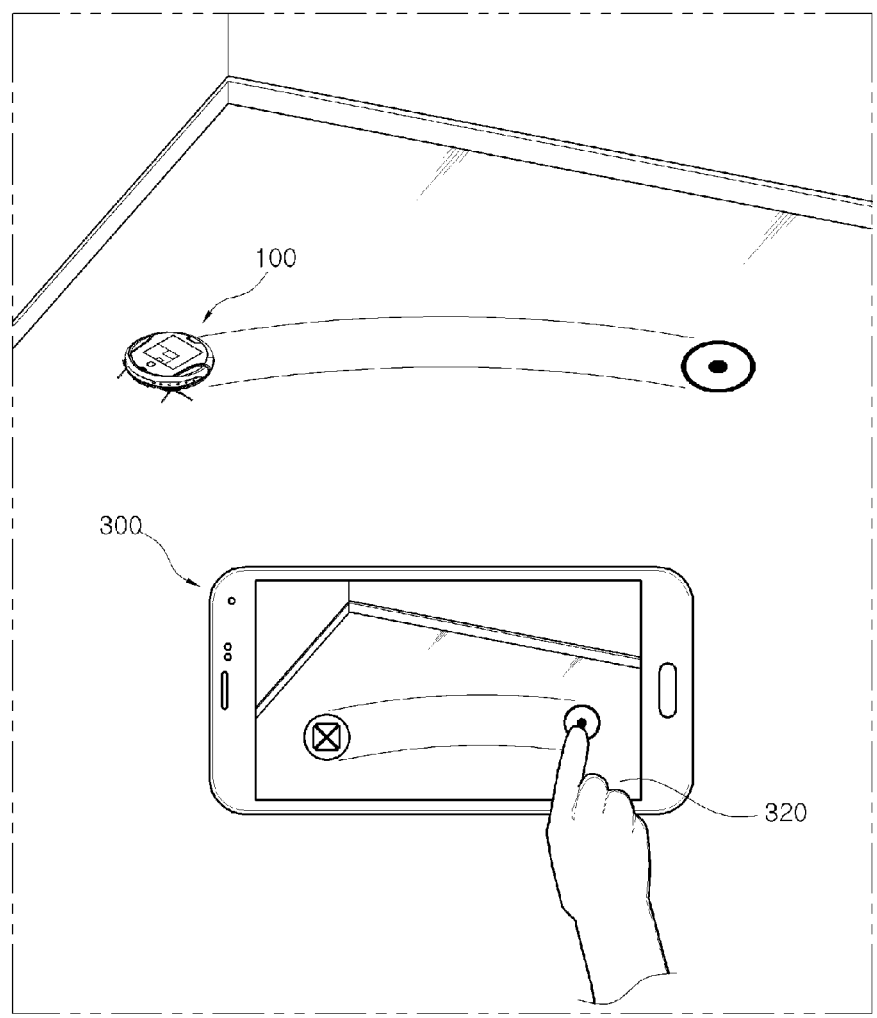

[Fig. 13b]
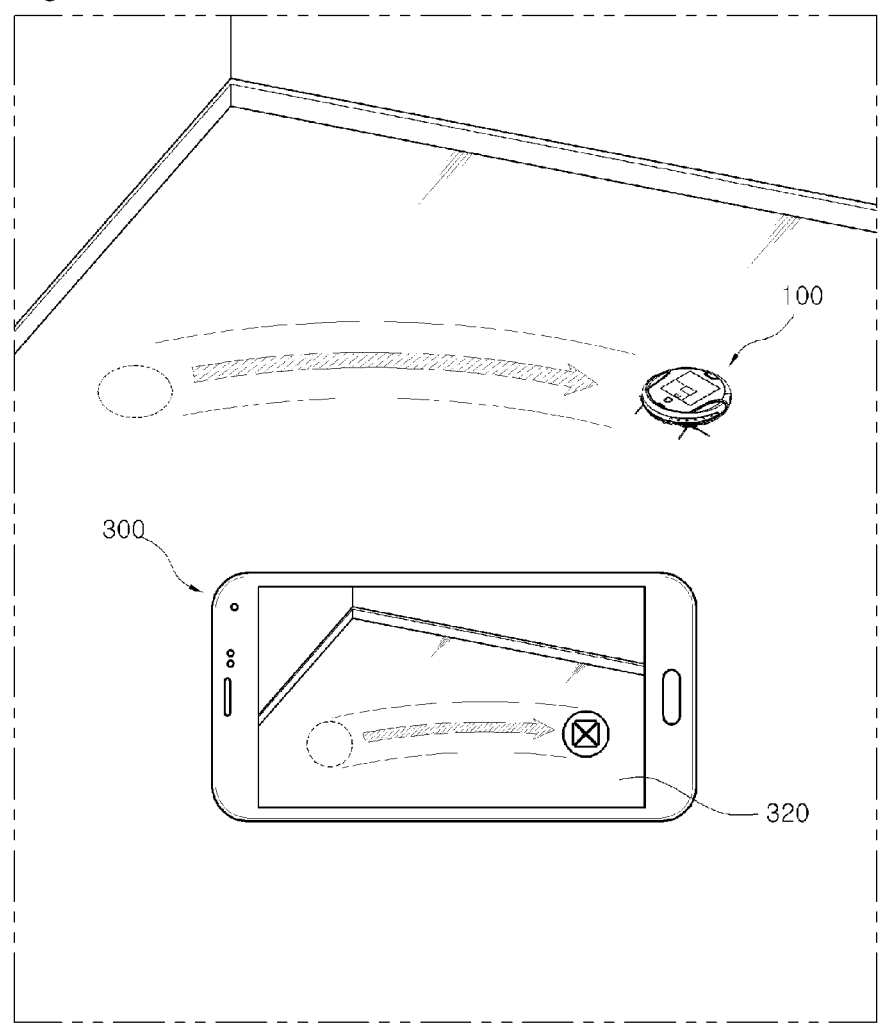

[Fig. 14]
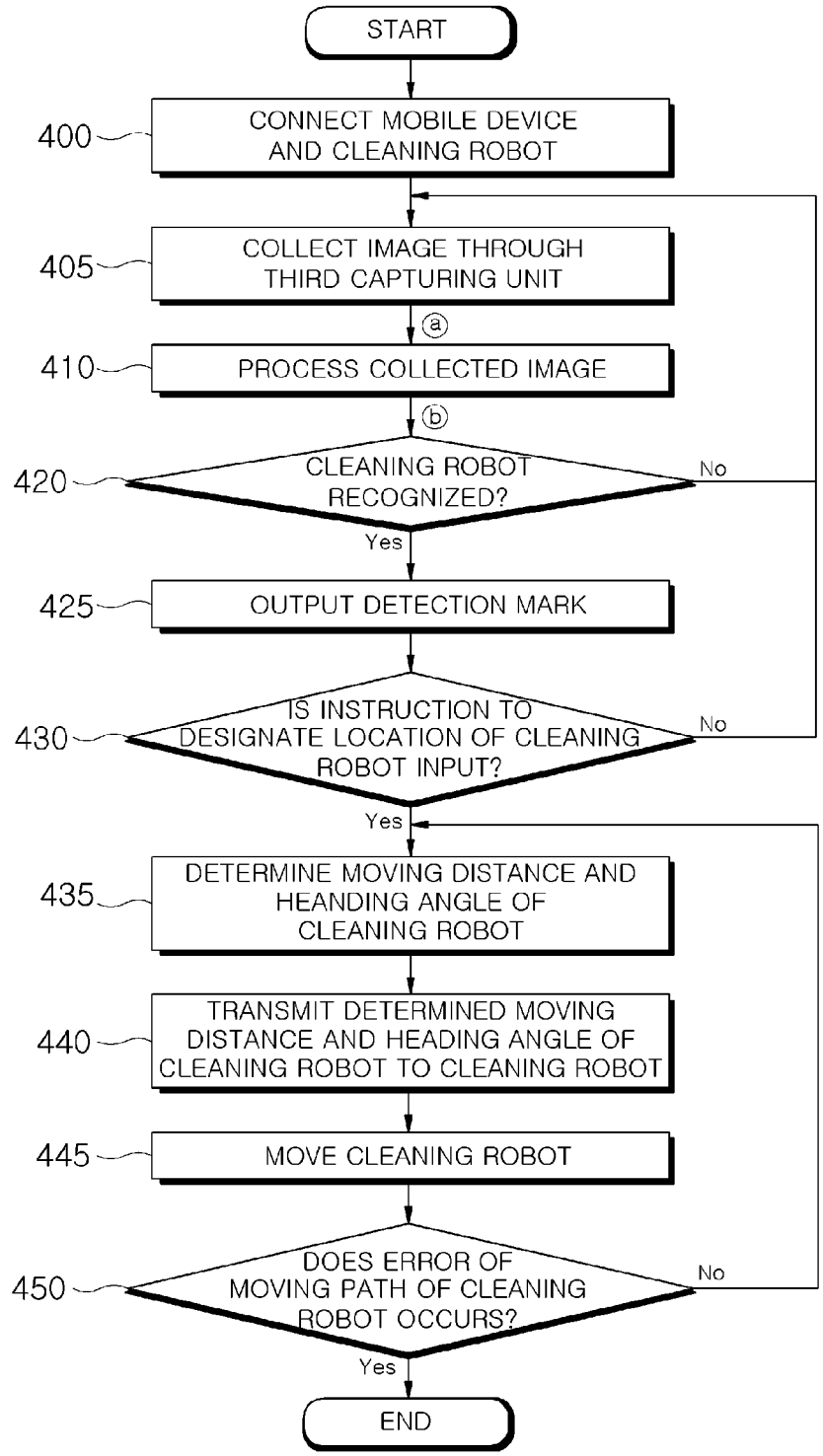

[Fig. 15a]
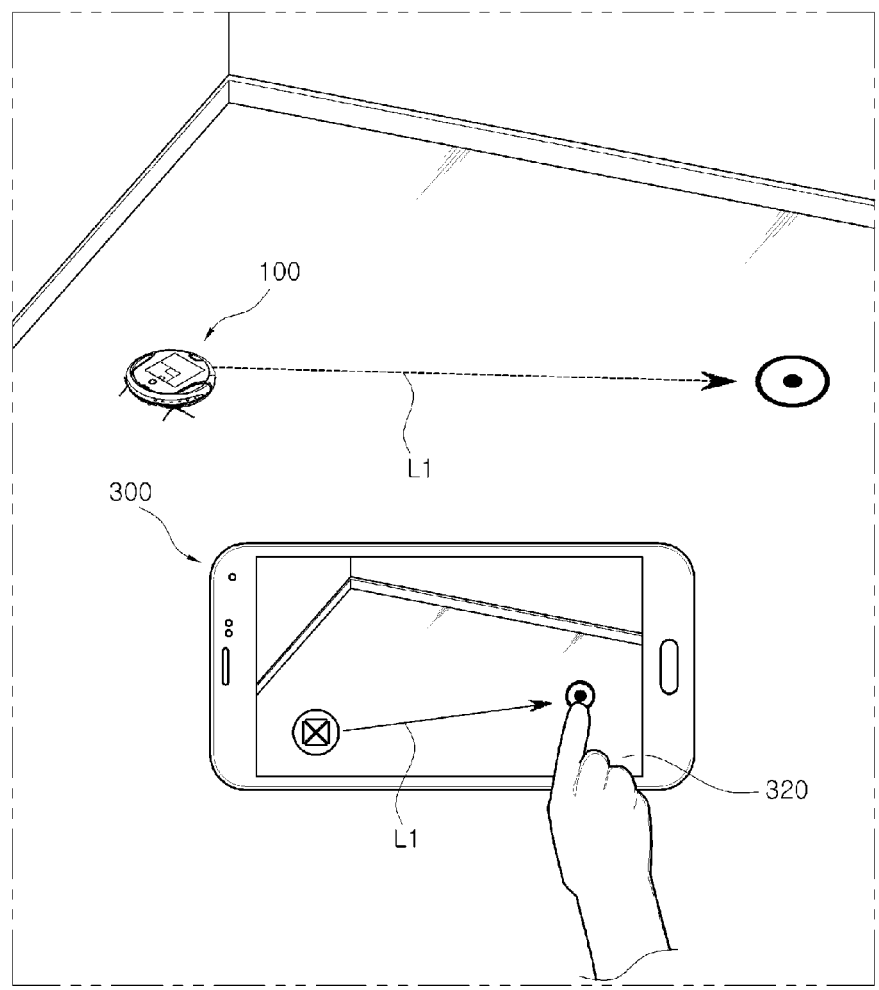

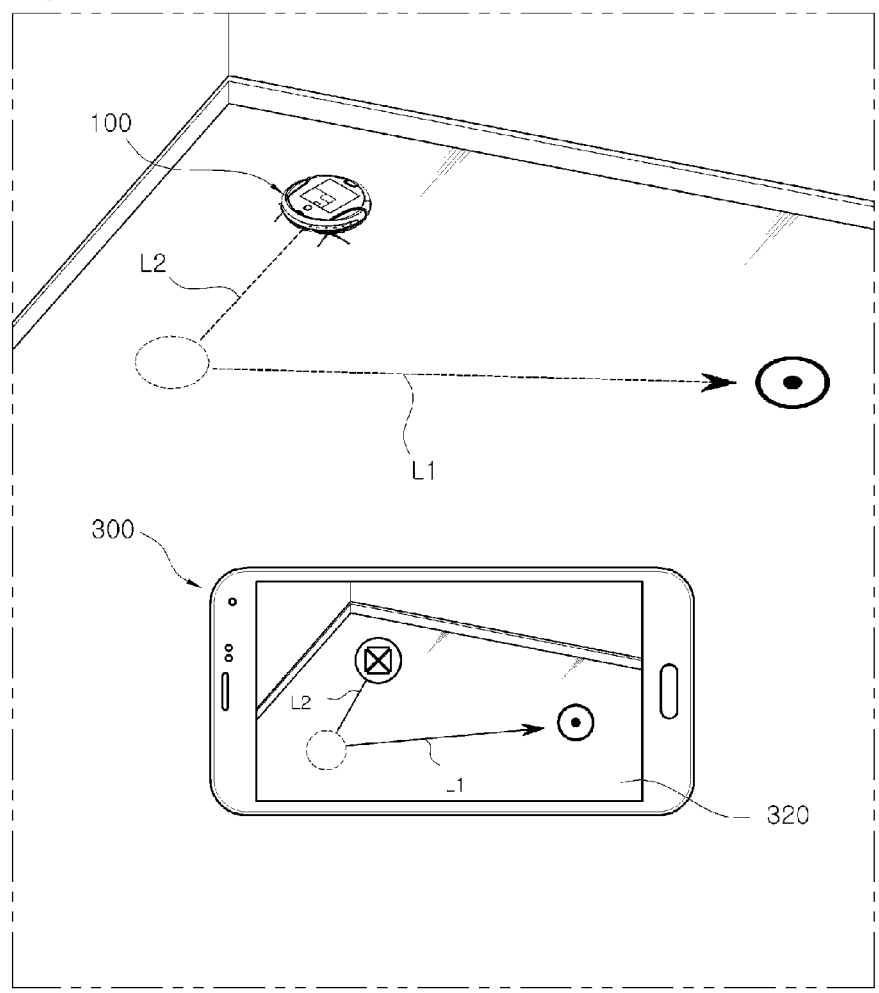
[Fig. 15b]

[Fig. 15c]
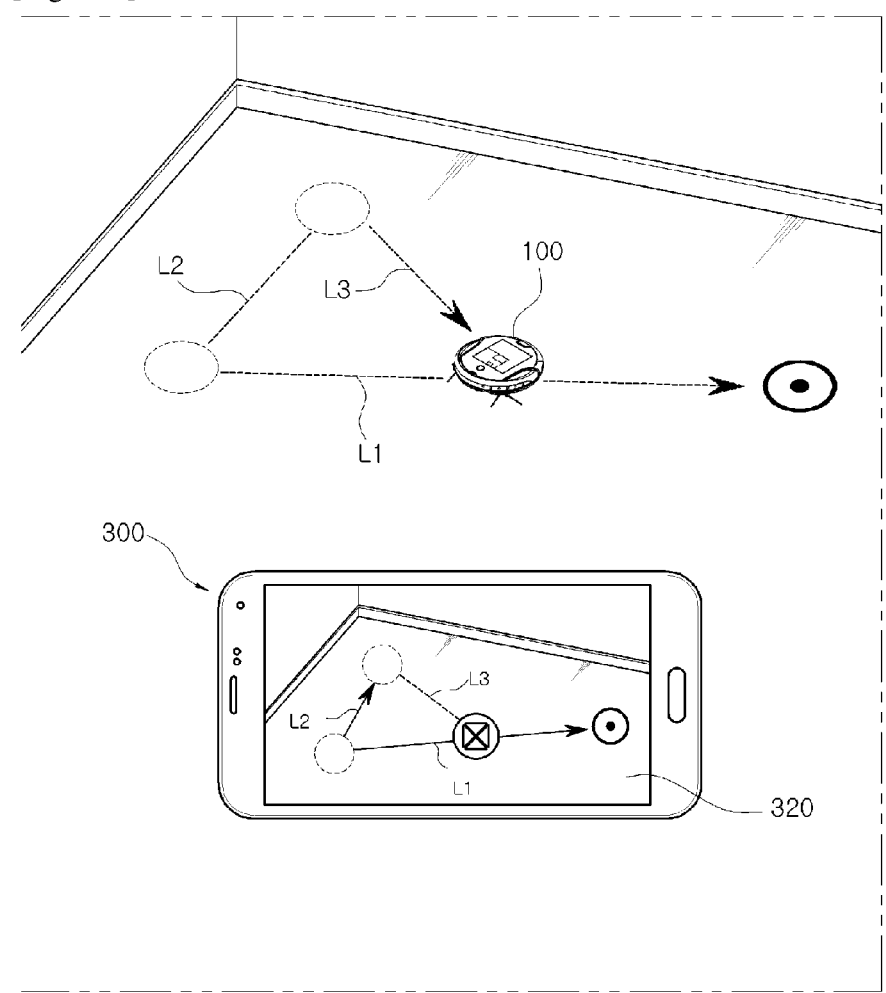

[Fig. 16]
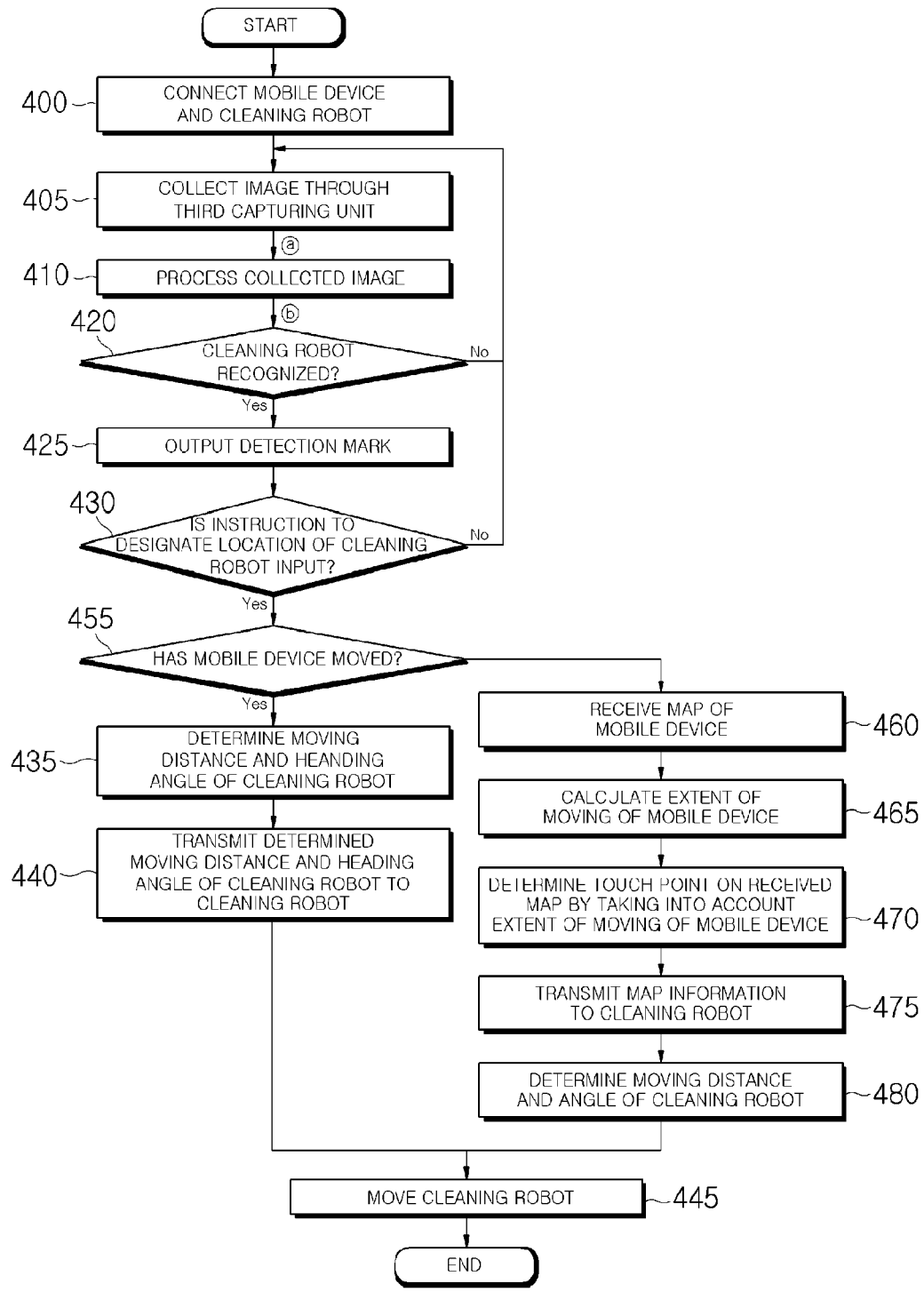

[Fig. 17]
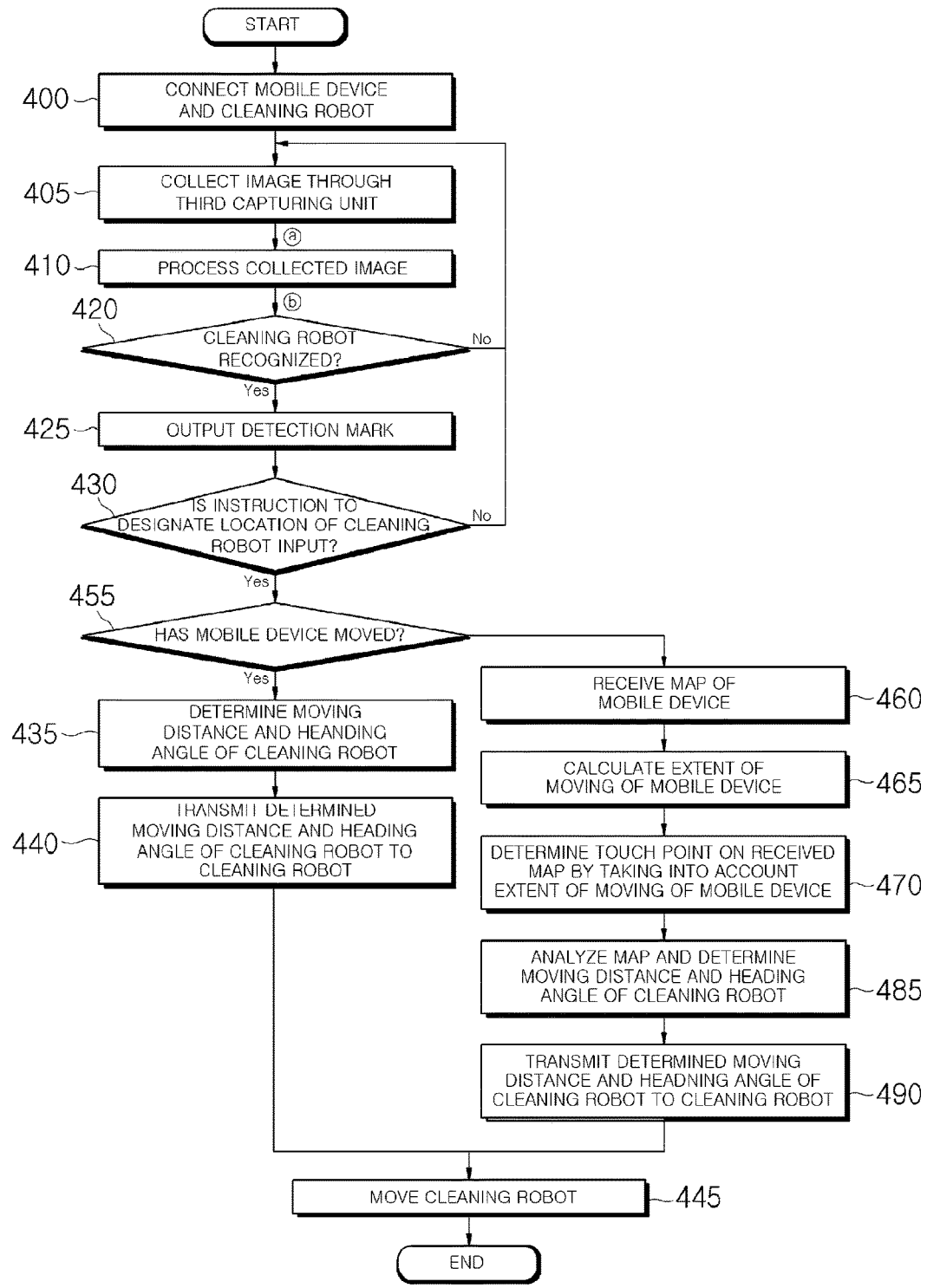

[Fig. 18a]
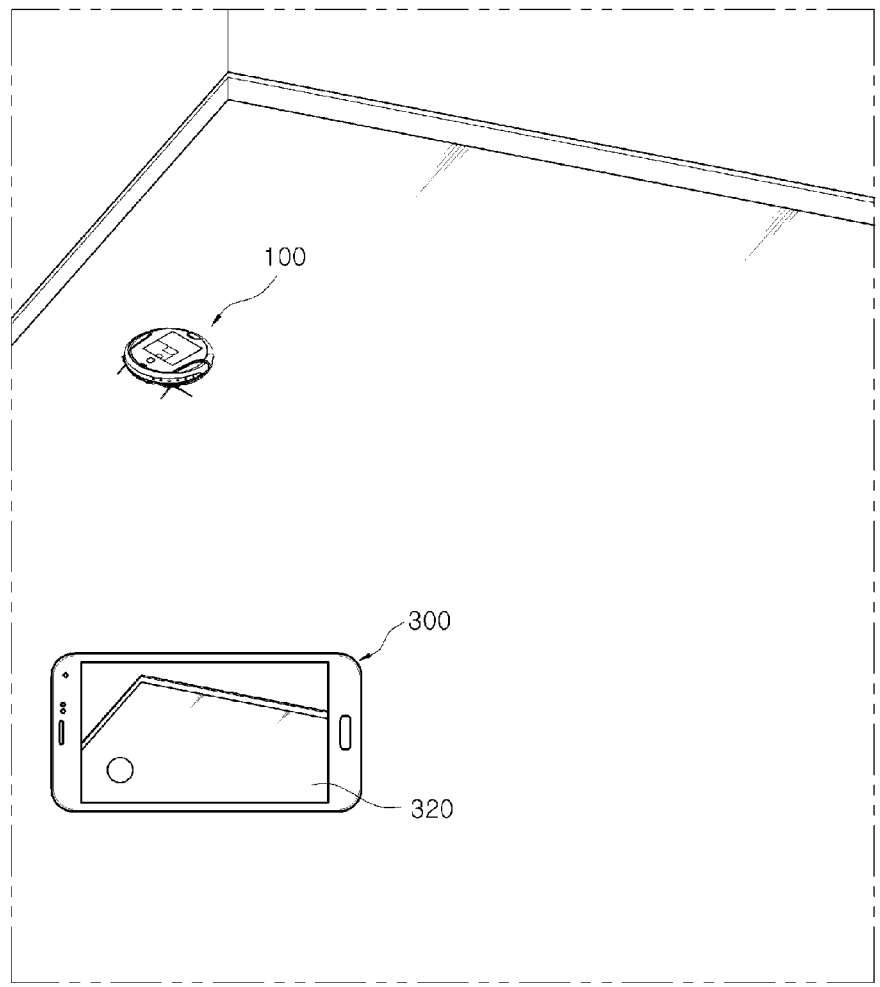

[Fig. 18b]
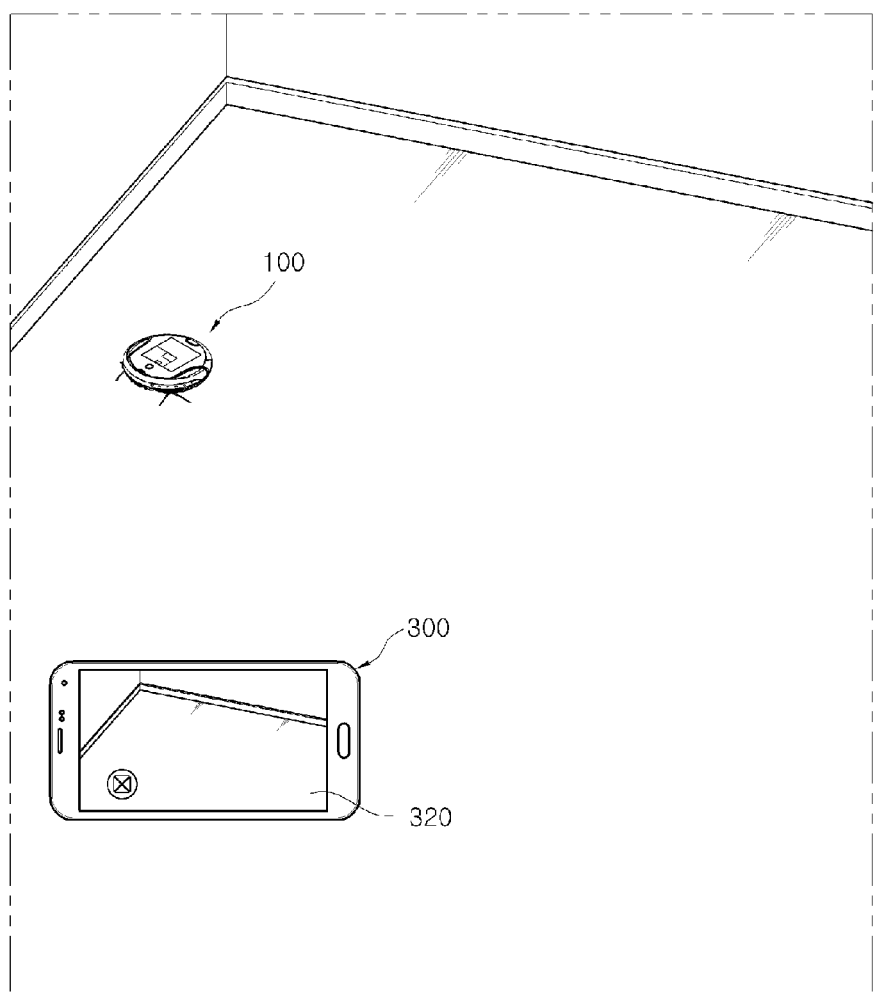

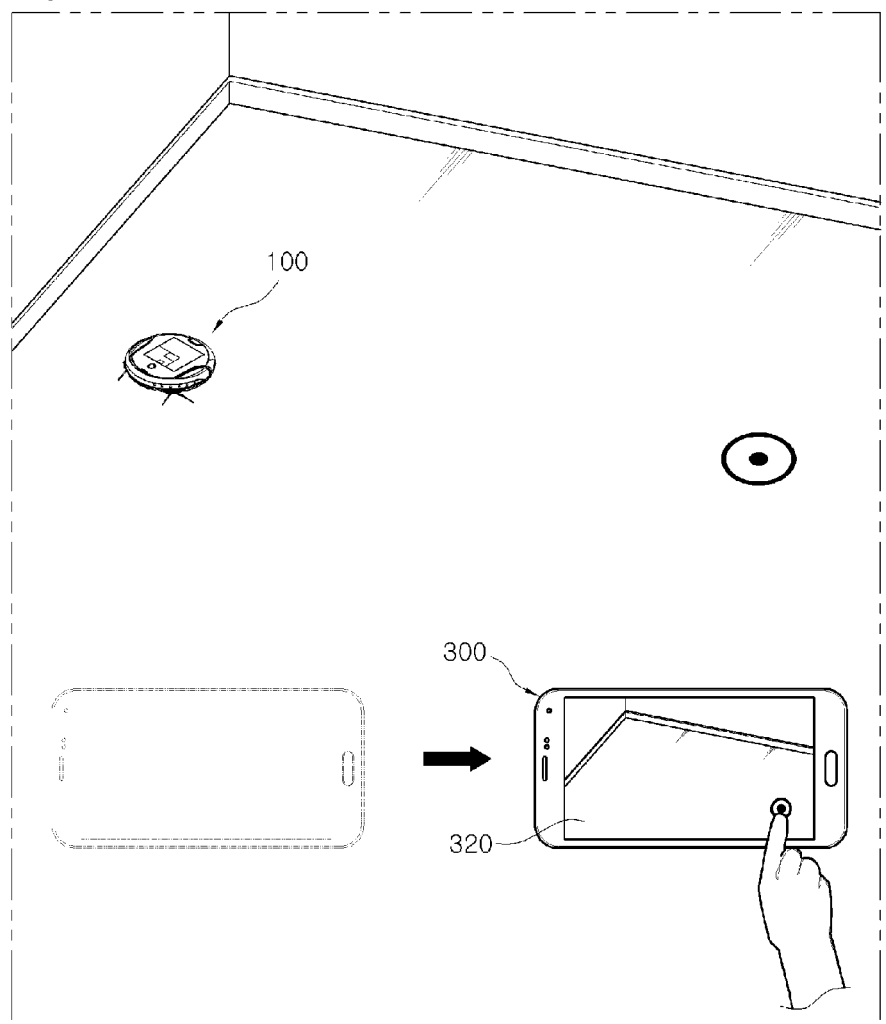
[Fig. 18c]

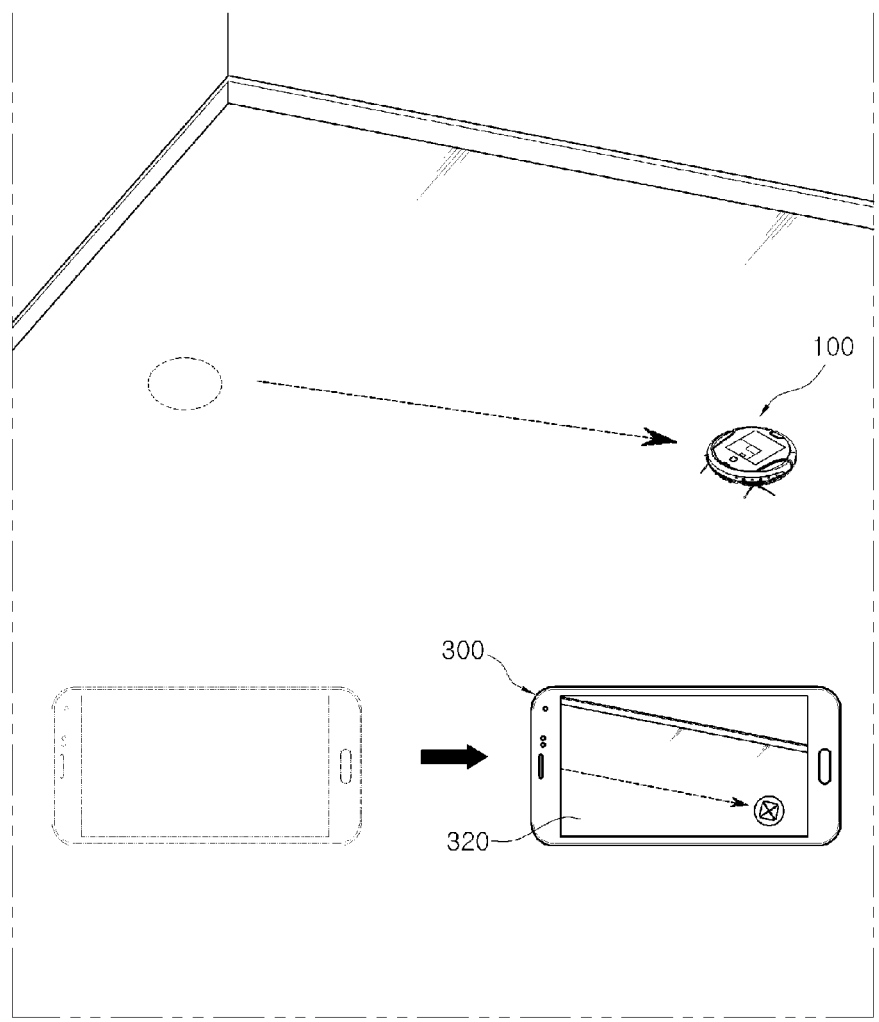
[Fig. 18d]

[Fig. 19]
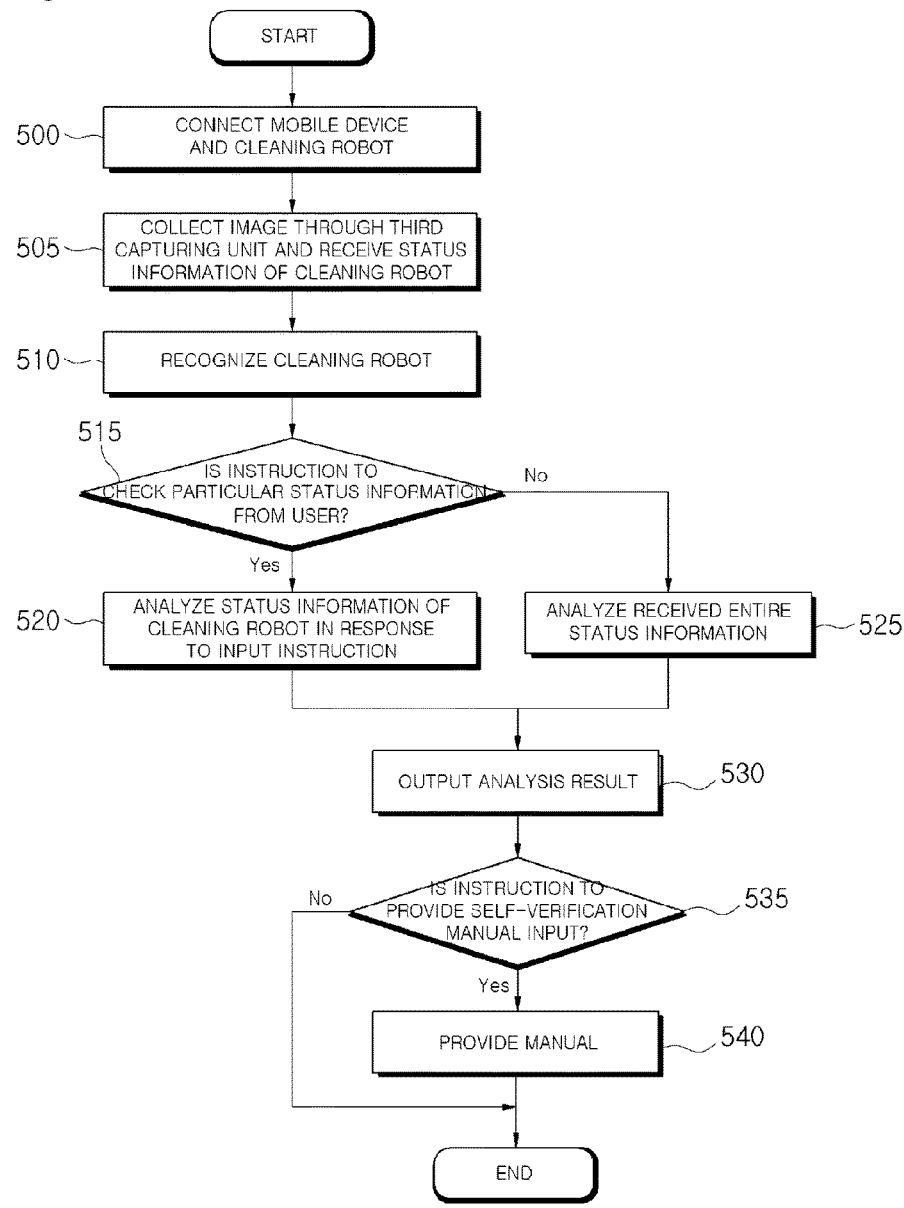
[Fig. 20]
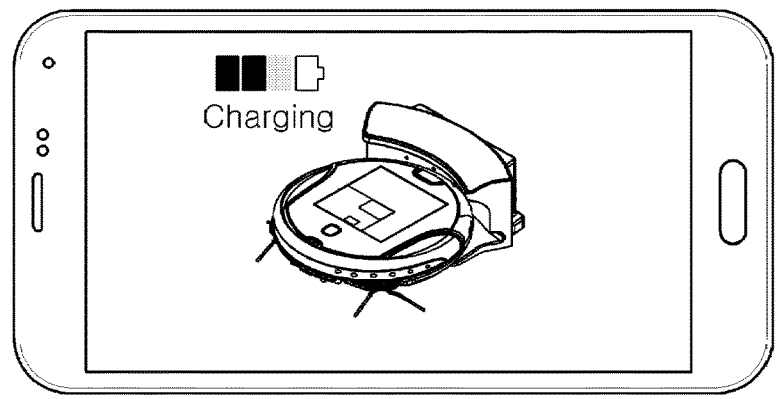

[Fig. 21]
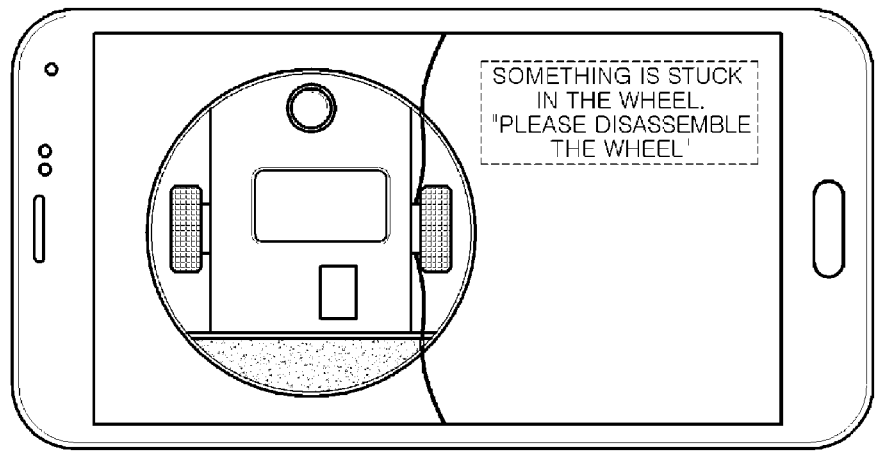
[Fig. 22a]
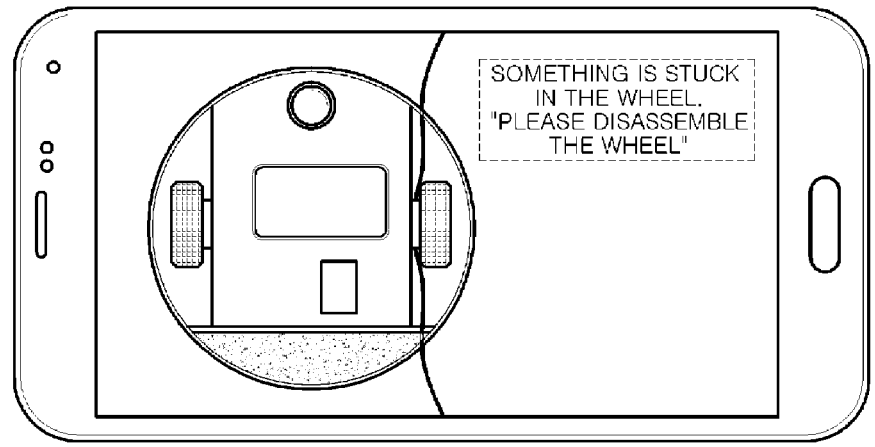
[Fig. 22b]
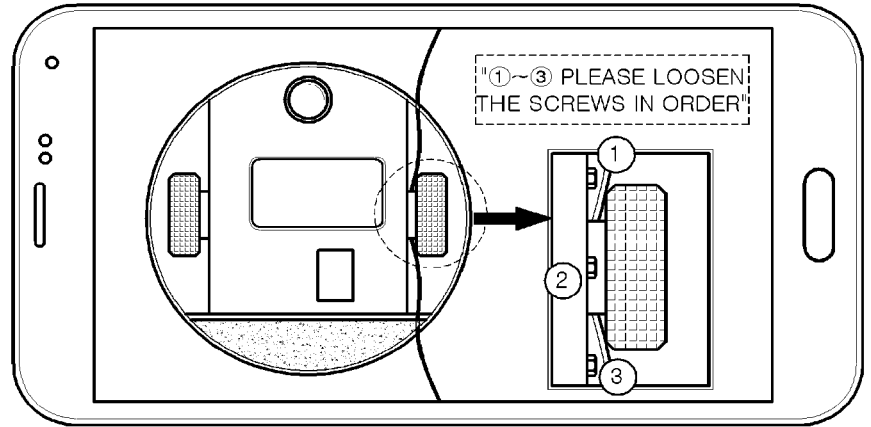

[Fig. 22c]
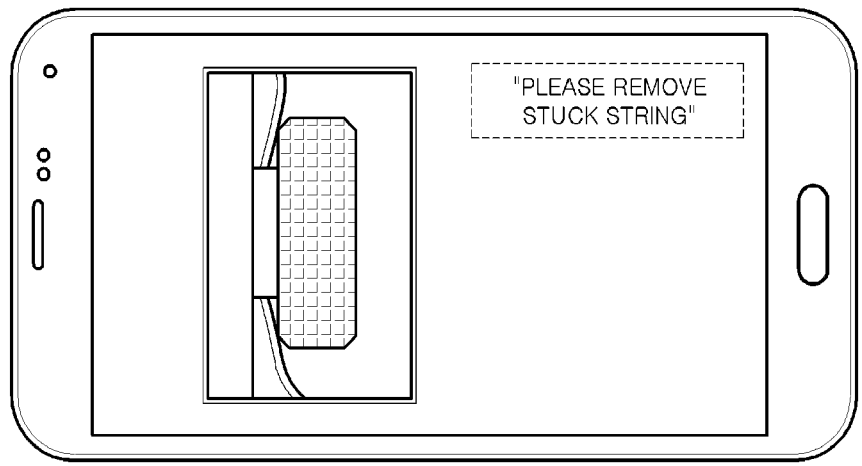
[Fig. 23]
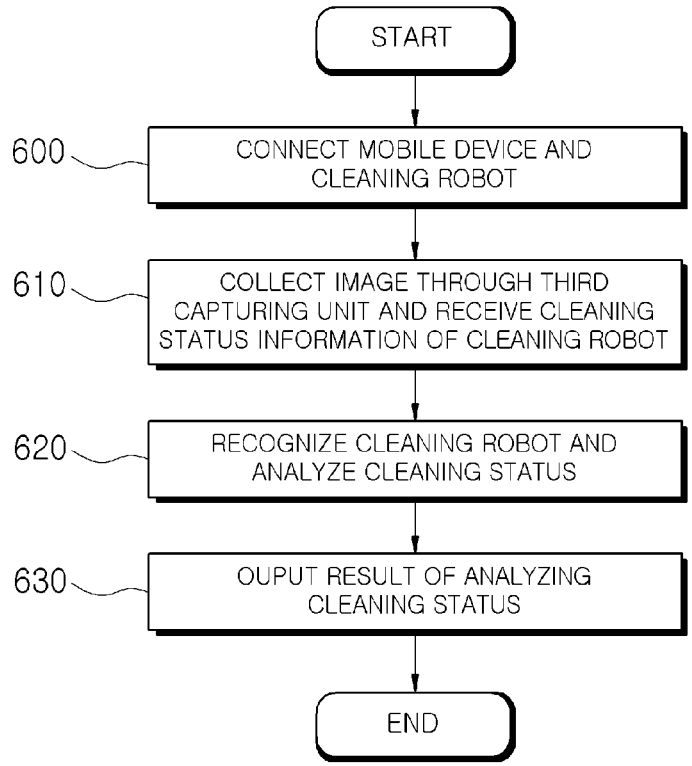

[Fig. 24]
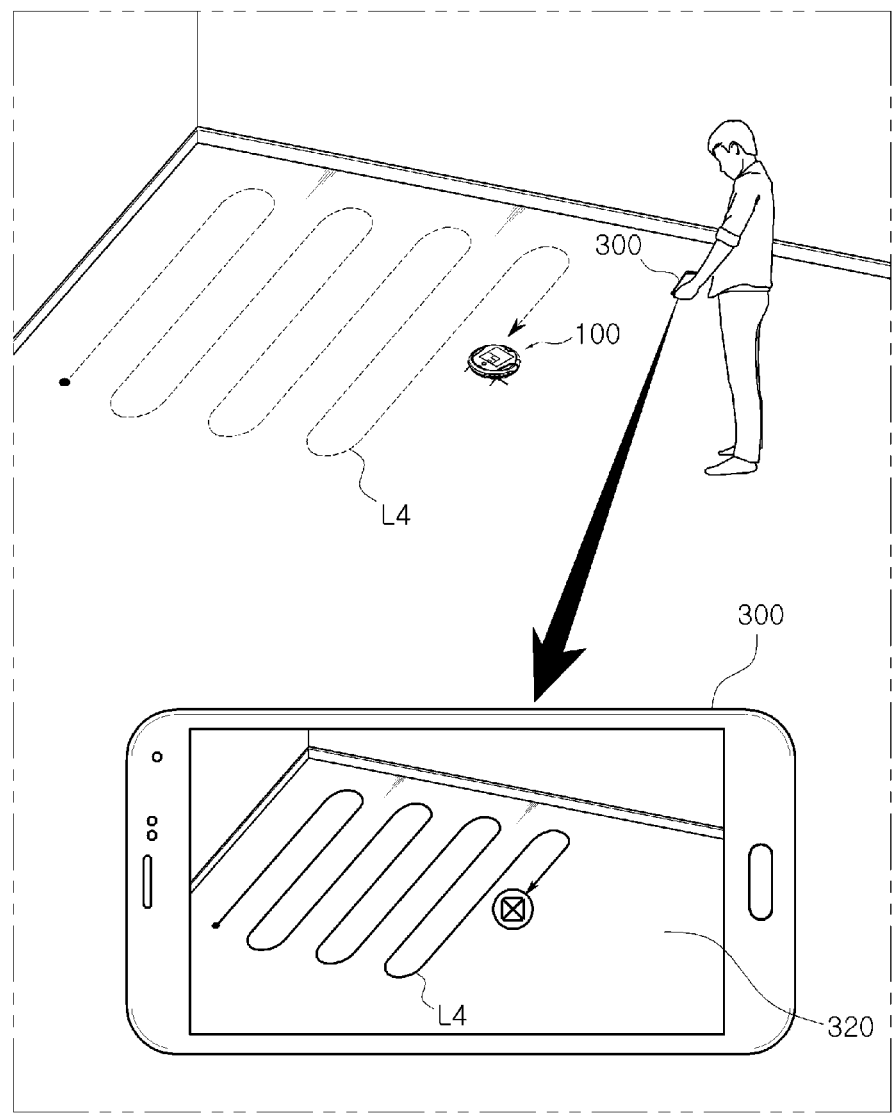

MOBILE DEVICE, ROBOT CLEANER, AND METHOD FOR CONTROLLING THE SAME

CROSS-REFERENCE TO RELATED APPLICATION(S)

The present application claims priority under 35 U.S.C. § 365 to International Patent Application No. PCT/KR2015/005346 filed May 28, 2015, entitled "MOBILE DEVICE, ROBOT CLEANER, AND METHOD FOR CONTROLLING THE SAME", and, through International Patent Application No. PCT/KR2015/005346, to Korean Patent Application No. 10-2014-0064205 filed May 28, 2014, each of which are incorporated herein by reference into the present disclosure as if fully set forth herein.

TECHNICAL FIELD

The present disclosure relates to a mobile device, cleaning robot, and method for controlling the cleaning robot using augmentation reality.

BACKGROUND ART

A cleaning robot is an apparatus that automatically cleans a region to be cleaned (hereinafter referred to as a cleaning region) by suctioning impurities, such as dust from a floor while autonomously moving about the cleaning region without user intervention.

Conventional cleaning robots are controlled to go straight, move backward, turn left or right, or the like, by manipulating a normal remote controller included in the product which operates in an infrared or short-range communication scheme, or controlled to be tilted or receive an impact by the user by means of an inertial sensor in the remote controller.

There are active and passive ways for the user to check the status of the cleaning robot. In the passive way, when the cleaning robot is malfunctioning, it provides alarming indications or alarming sound for the user.

However, with the conventional controlling method, the cleaning robot cannot be easily and quickly moved to a position desired by the user and if a sensor of the cleaning robot is malfunctioning, the user bothers to look up for a manual to figure out the status of the cleaning robot in person.

DISCLOSURE OF INVENTION

Technical Problem

The present disclosure provides a cleaning robot and method for controlling the same, by which a moving path of the cleaning robot is controlled by a mobile device.

The present disclosure also provides a cleaning robot and method for controlling the same, by which the current status of the cleaning robot may be shared with a mobile device in order to quickly troubleshoot problems.

The present disclosure also provides a cleaning robot and method for controlling the same, by which the cleaning status of the cleaning robot may be shared with a mobile device.

Solution to Problem

In accordance with an aspect of the present disclosure, a mobile device is provided. The mobile device includes: a capturing unit; a display for displaying an image of a cleaning robot obtained from the capturing unit and receiving a touch; and a controller for controlling the cleaning robot to move to a location that corresponds to the input touch.

The controller may control the cleaning robot to take a shortest path to a location that corresponds to the input touch.

The controller may control the cleaning robot to take a straight or curved path to a location that corresponds to the input touch.

The display may receive continuous or discontinuous touches, or single or multiple touches.

The controller may determine a moving distance and heading angle of the cleaning robot.

The controller may determine a moving distance and heading angle of the cleaning robot using homography matrix transformation.

The controller may re-determine a moving distance and heading angle of the cleaning robot, if it is determined that the cleaning robot deviates from a path established based on a touch.

The controller may determine a touch point on a map received from the cleaning robot by reflecting an extent of moving of the mobile device, if it is determined that the mobile device has been moved.

The controller may control the cleaning robot to a location that corresponds to the touch by outputting map information to the cleaning robot.

The controller may determine a moving distance and heading angle of the cleaning robot through the map, and outputting data signal about the moving distance and heading angle of the cleaning robot.

The controller may determine a moving distance and heading angle of the cleaning robot using a current location of the cleaning robot determined on the map and the touch point.

The cleaning robot may include a marker, and the controller may determine that the cleaning robot is recognized if the marker is recognized by processing an image obtained from the capturing unit.

The controller may digitize image information of the marker obtained from the capturing unit, and recognize the marker by detecting a candidate area of the marker from the image information.

The display may display a predetermined detection marker of the cleaning robot, which indicates that the cleaning robot has been recognized.

The mobile device may further include a communication unit for communicating with an external device including the cleaning robot.

The display may display a moving path of the cleaning robot.

The display may display a cleaning region or a region in need of cleaning of the cleaning robot.

In another aspect of the present disclosure, a mobile device is provided. The mobile device includes a capturing unit, and a display for displaying a cleaning robot image obtained from the capturing unit and status information of the cleaning robot.

The status information may include at least one selected from among information about battery charging state of the cleaning robot, information about whether there is dust or dirt, information about a dust bin of the cleaning robot, information about a caster, information about a fall sensor, and information about side brushes.

The display may display the status information of the cleaning robot around the cleaning robot image displayed on the display or at a predetermined spot on the display.

The mobile device may further include a sound output unit for outputting the status information of the cleaning robot.

The display may receive a user touch that requests status information of the cleaning robot.

The mobile device may further include a communication unit for communicating with an external device including the cleaning robot.

The mobile device may further include a storage for storing data of the status information of the cleaning robot.

The data of the status information stored in the storage includes what is obtained from a service center.

In an accordance with another aspect of the present disclosure, a cleaning robot is provided. A cleaning robot includes a main unit; and a marker arranged in the main unit, wherein the marker is displayed on a display of a mobile device, and the cleaning robot moves to a touch point when a touch is input to the display.

The cleaning robot may further include a controller for controlling the cleaning robot to move to the touch point when the marker is displayed on the display and the touch is input to the display.

The marker may be arranged on the top of the main unit.

The cleaning robot may further include a communication unit for communicating with an external device including the mobile device.

In accordance with another aspect of the present disclosure, a method for controlling a cleaning robot is provided. The method includes displaying an image of the cleaning robot on a display of a mobile device; receiving a touch through the display; and moving the cleaning robot to a location that corresponds to a point of the touch.

Moving the cleaning robot to a location that corresponds to a point of the touch may include moving the cleaning robot to the location that corresponds to the point of the touch by a shortest path.

Moving the cleaning robot to a location that corresponds to a point of the touch may include moving the cleaning robot to the location that corresponds to the point of the touch by a straight or curved path.

Receiving a touch through the display may include receiving continuous or discontinuous touches, or single or multiple touches.

The method may further determining a moving distance and heading angle of the cleaning robot.

The method may further include determining a moving distance and heading angle of the cleaning robot.

Determining a moving distance and heading angle of the cleaning robot may include determining the moving distance and heading angle to a location that corresponds to the point of the touch.

Determining a moving distance and heading angle of the cleaning robot may include determining a moving distance and heading angle of the cleaning robot using real-world coordinates of the cleaning robot and coordinates of a location that corresponds to the touch point.

The method may further include correcting deviation of the cleaning robot if it is determined that the cleaning robot deviates from a path established from the touch.

Correcting deviation of the cleaning robot may include re-determining a moving distance and heading angle of the cleaning robot.

Receiving a touch through the display may include receiving a touch through the display after the mobile device is moved.

The method may further include determining a moving distance and heading angle of the cleaning robot by reflecting the movement of the mobile device.

Determining a moving distance and heading angle of the cleaning robot by reflecting the movement of the mobile device may include receiving a map from the cleaning robot; calculating an extent of moving of the mobile device; and determining the touch point on the map by taking into account the extent of moving of the mobile device Determining a moving distance and heading angle of the cleaning robot by reflecting the movement of the mobile device may include determining a moving distance and heading angle of the cleaning robot by analyzing the map; and transmitting information about the moving distance and heading angle of the cleaning robot to the cleaning robot.

Determining a moving distance and heading angle of the cleaning robot by reflecting the movement of the mobile device may include transmitting the map to the cleaning robot; and determining a moving distance and heading angle of the cleaning robot by analyzing the map.

The method may further include outputting a detection mark indicating that the cleaning robot has been recognized.

Outputting a detection mark indicating that the cleaning robot has been recognized may include outputting the detection mark onto the display.

The method may further include displaying status information of the cleaning robot on the display.

The status information may include at least one selected from among information about battery charging state of the cleaning robot, information about whether there is dust or dirt, information about a dust bin of the cleaning robot, information about a caster, information about a fall sensor, and information about side brushes.

The method may further include displaying cleaning status of the cleaning robot on the display.

Displaying cleaning status of the cleaning robot on the display may include displaying a moving path, a cleaning region or a region in need of cleaning of the cleaning robot.

Advantageous Effects of Invention

As described above, the following advantages may be expected according to the embodiments of a mobile device, cleaning robot, and method for controlling the cleaning robot.

First, moving paths of the cleaning robot may be checked in real time by displaying an image of the cleaning robot on the display of a mobile device using augmentation reality.

With the image output on the mobile device, feedback control is enabled to correct errors produced while the cleaning robot is moving around, thus securing the correctness of moving of the cleaning robot.

Furthermore, various manual manipulation may be simply performed by freely establishing moving paths of the cleaning robot by means of the mobile device.

In addition, the status or cleaning status of the cleaning robot may be displayed on the display unit of the mobile device using augmentation reality.

BRIEF DESCRIPTION OF DRAWINGS

These and/or other aspects of the disclosure will become apparent and more readily appreciated from the following description of the embodiments, taken in conjunction with the accompanying drawings of which:

FIG. 1 is an arrangement of a cleaning system, according to an embodiment of the present disclosure;

FIG. 2 is a plane view of an exemplary cleaning robot of FIG. 1;

FIG. 3 is a bottom view of a cleaning robot, according to an embodiment of the present disclosure;

FIG. 4 illustrates exemplary markers for enabling clear recognition of forward and backward directions of the cleaning robot;

FIG. 5 is a control block diagram of a cleaning robot, according to an embodiment of the present disclosure;

FIG. 6 is a plane view of a mobile device of FIG. 1;

FIGS. 7A and 7B are control block diagrams of a mobile device, according to embodiments of the present disclosure;

FIG. 8 is a control block diagram of a cleaning system, according to an embodiment of the present disclosure;

FIGS. 9 and 10 are flow charts illustrating a procedure of designating a moving location of a cleaning robot and moving the cleaning robot to the moving location by means of augmentation reality, according to an embodiment of the present disclosure;

FIGS. 11A to 11D illustrate examples of designating a moving location of a cleaning robot and moving the cleaning robot to the moving location, according to an embodiment of the present disclosure;

FIGS. 12A and 12B illustrate examples of designating a moving location of a cleaning robot and moving the cleaning robot to the moving location, through multiple touches, according to an embodiment of the present disclosure;

FIGS. 13A and 13B illustrate examples of designating a moving location of a cleaning robot and moving the cleaning robot to the moving location, through touching and dragging, according to an embodiment of the present disclosure;

FIG. 14 is a flowchart illustrating a procedure of designating a moving location of a cleaning robot and moving the cleaning robot to the designated moving location, which includes a process of correcting an error of a moving path of the cleaning robot, according to an embodiment of the present disclosure;

FIGS. 15A to 15C illustrates examples of designating a moving location of a cleaning robot and moving the cleaning robot to the designated moving location, including a process of correcting an error of a moving path of the cleaning robot;

FIGS. 16 and 17 are flow charts illustrating procedures of designating a moving location of a cleaning robot and moving the cleaning robot to the moving location, which includes moving of a mobile device, according to embodiments of the present disclosure;

FIGS. 18A to 18D illustrate examples of designating a moving location of a cleaning robot and moving the cleaning robot to the moving location, including moving of a mobile device;

FIG. 19 is a flow chart illustrating a procedure of sharing status information and providing a self-verification manual of a cleaning robot using augmentation reality, according to an embodiment of the present disclosure;

FIGS. 20 and 21 illustrate occasions where the status of a cleaning robot is shared with a mobile device through a display unit of the mobile device;

FIGS. 22A to 22C illustrate an occasion where a self-verification manual of a cleaning robot is provided through a display unit of the mobile device;

FIG. 23 is a flow chart illustrating a procedure of providing and checking a cleaning status of a cleaning robot using augmentation reality, according to an embodiment of the present disclosure; and FIG. 24 illustrates an example of providing and checking a cleaning status, according to an embodiment of the present disclosure.

BEST MODE FOR CARRYING OUT THE INVENTION

Embodiments and features as described and illustrated in the present disclosure are only preferred examples, and various modifications thereof may also fall within the scope of the disclosure.

Embodiments of the present disclosure will now be described with reference to accompanying drawings.

FIG. 1 illustrates an arrangement of a cleaning system including a cleaning robot 100, a charging cradle 200 docked with the cleaning robot 100 for supplying power to the cleaning robot 100, and a mobile device 300 for performing communication with the cleaning robot 100.

The cleaning robot 100 may enter in cleaning mode when receiving a cleaning instruction from the user, or at a reserved time. The cleaning robot 100 may move around by receiving a moving instruction from the user through the mobile device 300, and perform cleaning while sucking in dust and dirt on the moving path of the cleaning robot 100.

When a touch is input to the mobile device 300, the cleaning robot 100 may move to a location that corresponds to the input touch. Moving to a location that corresponds to an input touch may include taking the shortest path to the location. It may also include taking a straight path or a curved path to the location.

If a touch for a single location is input from the user through the mobile device 300, the cleaning robot 100 may move to the location that corresponds to the single touch, and if touches for multiple locations are input, the cleaning robot 100 may pass the multiple locations that correspond to the touches. If touching and dragging is input, the cleaning robot 100 may move along a path that corresponds to the touching and dragging.

The charging cradle 200 is a spot where the cleaning robot 100 is docked and supplied with power. When receiving a stop cleaning instruction from the user, or determining that cleaning is done, or when a battery level drops below a threshold, the cleaning robot 100 may dock with the charging cradle 200 and when the docking is completed, start being charged by receiving power from the charging cradle 200.

The charging cradle 200 may include a transformer connected to an external commercial Alternate Current (AC) power source for receiving and transforming external commercial AC power, a rectifier for half-rectifying or full-rectifying the transformed power, a smoother for smoothing the rectified power, and a voltage regulator for regulating the smoothed power to a Direct Current (DC) power with a constant voltage, and supply the DC power output from the voltage regulator to the cleaning robot 100 through a power terminal.

The charging cradle 200 may further include a communication unit for transmitting and/or receiving a docking signal for docking with the cleaning robot 100 to and/or from the cleaning robot 100.

The mobile device 300, which may be carried by the user and capable of communication and image capturing, may communicate with the cleaning robot 100. The mobile device 300 may include a smart phone, a digital personal assistant (PDA), a laptop computer, a tablet, etc.

Locations for the cleaning robot 100 to move may be designated through the mobile device 300, and information about a status or cleaning status of the cleaning robot 100 may be output through the mobile device 300.

The mobile device 300 may receive continuous or discontinuous touches, or a single or multiple touches from the user.

The cleaning robot 100 and the mobile device 300 will now be described in more detail.

First, referring to FIGS. 2 to 5, the cleaning robot 100 will be described, and then referring to FIGS. 6, 7A and 7B, the mobile device 300 will be described.

FIG. 2 is a plane view of the cleaning robot 100 of FIG. 1, FIG. 3 is a bottom view of the cleaning robot 100, according to an embodiment of the present disclosure, FIG. 4 illustrates exemplary markers 105 that enable clear recognition of forward and backward directions of the cleaning robot 100, and FIG. 5 is a control block diagram of the cleaning robot 100, according to an embodiment of the present disclosure.

Referring to FIGS. 2 to 5, the cleaning robot 100 in accordance with an embodiment may include a main unit 110 that forms the exterior, a display 120 mounted on the top of the main unit 110 for receiving movement information and reservation information and displaying movement information, an imaging unit 130 mounted on the top of the main unit 110 for collecting images of surroundings of the main unit 110 within a cleaning area, obstacle sensors 140 mounted on front, left and right sides of the main unit 110 for detecting an obstacle in the front, left or right direction, a communication unit 150 for communicating with an external device, such as the charging cradle 200 and the mobile device 300, moving assemblies 160 installed on the bottom of the main unit 110 for moving the main body of the cleaning robot 100, cleaning tool assemblies 170, 174 installed on the bottom of the main unit 110 for sweeping or scattering dust on the floor, or sucking in swept or scattered dust, and a driving module 190. The driving module 190 may include drivers 193, 194, a storage 192, and a controller 195. In order to be distinguished from the components of the mobile device 300, which will be described later, the display 120, the imaging unit 130, the communication unit 150, the drivers 193, 194, the storage 192, and the controller 195 will hereinafter be denoted as a first display 120, a first imaging unit 130, a first and second communication units 151 and 152, first and second drivers 193, 194, a first storage 192, and a second controller 195, respectively.

A bumper may be mounted on the front or back of the main unit 110 for absorbing shock of the collision with an obstacle, and a marker 115 may be formed on the top of the main unit 110 for allowing the mobile device 300 to recognize the cleaning robot 100.

The marker 115 is a means for allowing recognition of whether the cleaning robot 100 is present or not and in which direction the cleaning robot 100 is heading, and may have any form that enables clear recognition of the forward and backward directions of the cleaning robot 100.

For example, in a case of FIG. 2, forward and backward directions of the cleaning robot 100 may be determined with respect to the major axis of area a of the marker 105. A direction toward area b to which the minor axis of the area a of the marker 105 is directed may be determined as the backward direction of the cleaning robot 100, and an opposite direction of the area b to which the minor axis of the area a of the marker 105 is directed may be determined as the forward direction of the cleaning robot 100.

Referring to FIG. 4, in case (a), a direction to which a single circle is directed may be determined as the forward direction of the cleaning robot 100, and a direction to which two circles are directed may be determined as the backward direction of the cleaning robot 100. In case (b) of FIG. 4, a direction to which the vertex of an isosceles triangle is directed may be determined as the forward direction of the cleaning robot 100, and a direction to which the bottom side of the isosceles triangle are directed may be determined as the backward direction of the cleaning robot 100. In case (c) of FIG. 4, a direction to which the thinnest rectangle is directed may be determined as the forward direction of the cleaning robot 100, and a direction to which the thickest rectangle is directed may be determined as the backward direction of the cleaning robot 100. In case (d) of FIG. 4, a direction to which the vertex of an isosceles triangle is directed may be determined as the forward direction of the cleaning robot 100, and a direction to which a circle below the isosceles triangle is directed may be determined as the backward direction of the cleaning robot 100.

These are only examples of the marker 105, and it is possible to make various modifications thereof. The marker 105 may be replaced with a shape or design of the cleaning robot 100, a signal originating system, a particular color LED, etc., to increase the rate of recognition of the cleaning robot 100.

The first display 120 may receive an instruction from the user and display operating status of the cleaning robot 100. More specifically, the first display 120 may include an input unit 121 for receiving cleaning reservation information, a cleaning start or stop instruction, an operation mode, a moving pattern, etc., and an indication unit 122 for displaying the cleaning reservation information, a charging status, a dust collection level, a moving pattern, an operation mode, etc. The operation mode may include a cleaning mode, a standby mode, a docking mode, a reservation mode, etc. To be distinguished from the components of the mobile device 300, which will be described later, the input unit 121 and the indication unit 122 are denoted as the first input unit 121 and the first indication unit 122, respectively.

The first imaging unit 130 may collect images of surroundings of the main unit 110. In an embodiment, the first imaging unit 130 may be directed upward, opposite to the bottom, for image capturing.

The first imaging unit 130 may collect images of surroundings of the main unit 110 to make a map of the inside of a home in a map making mode, or to detect a position and obstacle of the main unit 110 in a cleaning mode.

The first imaging unit 130 may include a first capturing unit 131 and a second capturing unit 132. The first and second capturing units 131 and 132 may be placed on the front and back or on the left and right, with respect to a moving direction.

The first and second capturing units 131 and 132 may each include a two dimensional (2D) color camera for collecting a 2D color image. Two 2D images collected by the first and second capturing units 131 and 132 may be used to obtain a 3D image.

Also, the first and second capturing units 131 and 132 may each include an infrared transceiver if necessary. Alternatively, the first capturing unit 131 may include a 2D color camera while the second capturing unit 132 may include a depth camera, which is a kind of 3D camera.

The first imaging unit 130 may activate both the first and second capturing units 131 and 132 in the map making mode, and activate only the first capturing unit 131 in the cleaning mode.

The obstacle sensor 140 may include at least one of a range sensor for detecting a distance to an obstacle and a collision sensor for detecting collision with an obstacle.

The communication unit 150 may connect the cleaning robot 100 to an external device under control of the first controller 195. The communication unit 150 may include a first communication unit 151 for communicating with the charging cradle 200 in the docking mode, and a second communication unit 152 for communicating with the mobile device 300.

The first communication unit 151 may perform communication for docking in at least one of RF, infrared, and ultrasound communication schemes, and the second communication unit 152 may use at least one of wireless local area network (WLAN) and short-range communication schemes for communicating with the mobile device 300.

With the WLAN communication scheme, the second communication unit 152 may be wirelessly connected to an Access Point (AP) in an area where the AP is installed, under control of the first controller 195.

The short-range communication scheme may include bluetooth, bluetooth low energy, infrared data association (IrDA), Wi-Fi, Ultra Wideband (UWB), Near Field Communication (NFC), etc.

The moving assemblies 160 may include a pair of wheels 161, 162 installed on the left and right sides from a center area of the main unit 110, wheel motors 163, 164 for applying moving forces to the wheels 161, 162, a caster wheel 165 installed on the bottom front of the main body 110 and rotated by different angles based on the condition of the floor on which the cleaning robot 100 is moving around.

The pair of wheels 161, 162 may be symmetrically arranged in the main unit 110.

The caster wheel 165 may support the cleaning robot 100 by being used for stable positioning and prevention of fall of the cleaning robot 100. The caster wheel 165 may have the shape of roller or caster.

The cleaning tool assemblies 170, 174 may include a main brush assembly installed on the bottom of the main unit 110 for sweeping or scattering dust, and sucking in swept or scattered dust, and side brush assemblies 174 installed on the bottom of the main unit 110 to be able to protrude outward for sweeping dust in other areas than the area cleaned by the main brush assembly 170 toward the main brush assembly 170.

The main brush assembly 170 may be arranged in an intake located in the lower part of the main unit 110. The main brush assembly 170 may include a main brush 172 for sweeping or scattering dust on the floor below the main unit 110, and a brush motor 173 for rotating the main brush 172. The main brush 172 may include a roller mechanically connected to the brush motor 173, and a brush member mounted on the outer circumference of the roller. Specifically, the brush motor 173 may drive the roller of the main brush 172 to be rotated, which in turn rotates the brush member mounted on the roller. At this time, the brush member of the main brush 172 may sweep dust on the floor toward the intake 171.

The side brush assemblies 174 may sweep dust on the floor in the forward and side directions of the main unit 110 and dust not reached by the main brush 172 toward the intake 171, thus improving cleaning efficiency. The side brush assemblies 174 may include a first side brush assembly 174a located on the left of the bottom front of the main body 110 and a second side brush assembly 174b located on the right of the bottom front of the main body 110.

Furthermore, the first and second side brush assemblies 174a, 174b may each include a main body detachably mounted onto the main unit 110, a side arm able to protrude outward of the main unit 110, and a brush rotationally mounted on the side arm. Alternatively, the first and second side brush assemblies 174a, 174b may only include respective side brushes rotationally mounted on the left and right sides of the main unit 110.

A power supply unit 180 may include a battery that is electrically connected to the various components of the main unit 110 for supplying power to the components. The battery may include a secondary rechargeable battery that is electrically connected to the charging cradle 200 to be recharged with power from the charging cradle 200.

The driving module 190 may drive the first indication unit 122 of the first display 120, and drive the moving assembly 160, the cleaning tool assembly 170, 174, and the communication unit 150 based on information input through the first input unit 121 of the first display 120, obstacle information detected by the obstacle sensor 140, and/or image information sent from the mobile device 300.

The first storage 192 may store various data, programs, or applications for driving and controlling the cleaning robot 100.

The first storage 192 may store input and output signals or data involved in driving the communication unit 150, the first display 120, and the power supply unit 180.

The first storage 192 may store control programs to control the cleaning robot 100 and the first controller 195, dedicated applications initially offered by the manufacturer or universal applications downloaded from outside, user information, documents, databases, or associated data.

The first storage 192 may store information about moving paths of the cleaning robot 100.

The first storage 192 may store information about the status of the cleaning robot 100 in a database. The database regarding the status of the cleaning robot 100 may include information about the dust bin, information about the wheels, information about the main brush 172, information about the obstacle sensor 140, information about the caster, information about the fall sensor, information about the side brushes, etc. Furthermore, the first storage 192 may store information about the status of the cleaning robot 100 received in the process of communicating with a service center.

The first driver 193 may drive the wheel motors 163, 164 of the moving assembly 160. Varying the speed of rotation of the left and right wheel motors 163, 164 may enable rotation of the main unit 110.

The second driver 194 may drive the brush motor 173 of the cleaning tool assembly 170, 174.

The first controller 195 may control general operation of the cleaning robot 100 and signal flows between the internal components of the cleaning robot 100, and process the data. The first controller 195 may run a program or application stored in the first storage 192 if a user instruction is received or a predetermined and pre-stored condition is met.

The first controller 195 may control the first indication unit 122 of the first display 120 to output the cleaning reservation information, contents of the cleaning start/stop, etc., received through the first input unit 121 of the first display 120.

The first controller 195 may make a map of a cleaning area from images collected through the first and second capturing units 131, 132 of the first imaging unit 130, and control the map to be stored in the first storage 192. Furthermore, the first controller 195 may figure out where the cleaning robot 100 is from the images collected by the first imaging unit 130. Figuring out the location of the cleaning robot 100 may include determining a location of the cleaning robot 100 on the map.

The first controller 195 may receive obstacle detection information output from the obstacle sensor 140, and control the first driver 193 to drive the wheel motors 163, 164 to make the cleaning robot 100 move around while avoiding obstacles.

The first controller 195 may receive a control signal for the cleaning robot 100 from the mobile device 300 through the second communication unit 152. More specifically, the first controller 195 may output a control signal received through the second communication unit 152 to the first driver 193 to control driving of the wheel motors 163, 164, and output the control signal to the second driver 194 to control driving of the brush motor 173. In this regard, the cleaning robot 100 may be moved to a location corresponding to a touch point input to the mobile device 300.

There may be a movement error occurring while the cleaning robot 100 is moving to the location corresponding to the touch point input to the mobile device 300. In this case, the first controller 195 may receive a control signal about a new path with the movement error of the cleaning robot 300 corrected, through the second communication unit 152 that may be connected to the mobile device 300, and control the cleaning robot 100 to move along the new path.

The first controller 195 may control the second communication unit 152 to output information about the status of the cleaning robot 100 or the cleaning status of the cleaning robot 100 to an external device including the mobile device 300.

FIG. 6 illustrates the mobile device 300 of FIG. 1, and FIGS. 7A and 7B are control block diagrams of the mobile device 300, according to embodiments of the present disclosure.

Referring to FIGS. 6, 7A and 7B, the mobile device 300 in accordance with an embodiment may include a main unit 310 that forms the exterior, a display 320 for receiving operation instructions from the user and displaying operation information, an imaging unit 330 placed on the front or back face of the main unit 310 for collecting images of surroundings of the main unit 310, a storage 340 for storing various data, programs, or applications to operate and control the mobile device 300, a communication unit 350 for communicating with an external device including the cleaning robot 100, and a controller 360 for controlling general operation of the mobile device 300. The mobile device 300 may further include a sound output unit 370 for outputting the status information of the cleaning robot 100.

To be distinguished from the components of the cleaning robot 100, the corresponding components will be herein denoted as a second display 320, a second imaging unit 330, a second storage 340, a third communication unit 350, and a second controller 360.

The second display 320 may receive user instructions and display operation information, and include a second input unit 321 for receiving instructions for image capturing, image selection, image transmission, and a task, and a second indication unit 322 for displaying a captured image, a transmission guide, a transmission result, task items, etc.

The second display 320 may be implemented with a touch screen, in which case the second input unit 321 may receive touch inputs from the user. Various input schemes including voice recognition, gesture recognition, and clicking commands may be employed by the second input unit 321.

The second display 320 may display a detection mark of the cleaning robot 100, which is predetermined to indicate that the cleaning robot 100 is recognized. Means for indicating that the cleaning robot 100 is recognized is not limited to outputting the detection mark through the second display 320, but may include anything that ordinary skilled people in the art may easily make use of, such as beep, vibration, etc., of the mobile device 300.

The second display 320 may display status information of the cleaning robot 100, a moving path of the cleaning robot 100, a cleaning area, or an area in need of cleaning. Displaying the status information of the cleaning robot 100 may include displaying the status information around the cleaning robot 100 or at a predetermined particular point on the second display 320.

The second imaging unit 330 is a device for obtaining images of the cleaning robot 100, and include a capturing unit 331 mounted on the front or back side of the mobile device 300. The capturing unit 331 may be mounted on one of the front and back sides of the mobile device 300, or on both the front and back sides. In the latter case, image capturing direction may be determined by the user's selection. To be distinguished from the corresponding component of the cleaning robot 100, the capturing unit 331 may be hereinafter denoted as the third capturing unit 331.

The second storage 340 may store control programs to control the mobile device 300 and the second controller 360, dedicated application initially offered by the manufacturer, universal applications downloaded from outside, user information, documents, databases, and/or associated data.

The second storage 340 may store images captured by the second imaging unit 330, which may be provided for recognition of the cleaning robot 100.

The second storage 340 may store touch information input through the first display 120 of the mobile device 300. More specifically, the second storage 340 may store continuous or discontinuous touches, single or multiple touches input through the first display 120.

The second storage 340 may store information about the status of the cleaning robot 100 in a database. As described above, the information about the status of the cleaning robot 100 may include information about the battery charging status, information about whether there is dust or dirt, information about the dust bin, information about the wheels, information about the main brush 172, information about the obstacle sensor 140, information about the caster, information about the fall sensor, information about the side brushes, etc. Furthermore, the second storage 340 may store information about the status of the cleaning robot 100 received in the process of communicating with a service center. These pieces of information may be used in a process of determining and verifying the status of the cleaning robot 100.

The second storage 340 may store information about moving paths of the cleaning robot 100, and a map of a cleaning area. The moving paths of the cleaning robot 100 and the map of a cleaning area may be used in determining the cleaning status of the cleaning robot 100.

The third communication unit 350 may communicate with the second communication unit 152 of the cleaning robot 100. The mobile device 300 may transmit a control signal to the cleaning robot 100 and receive information about the status of the cleaning robot 100 or the cleaning status (or a moving path) of the cleaning robot 100, through the third communication unit 350.

The second controller 360 may control general operation of the mobile device 300 and signal flows between the internal components of the mobile device 300, and process the data. The second controller 360 may run a program or application stored in the second storage 340 if a user instruction is received or a predetermined and pre-stored condition is met.

The second controller 360 may include a cleaning robot recognizer and a user motion detector.

The cleaning robot recognizer may include an image capturing unit for recognizing the cleaning robot 100, a marker detector for detecting the marker 105 of the cleaning robot 100, a user-designated recognizer for calculating coordinates of a location corresponding to a touch point on the second display 320, and a moving direction and distance calculator for detecting a 2D space range based on the touch point on the second display unit 320 and the cleaning robot 100.

The cleaning robot recognizer may determine a moving distance and heading angle of the cleaning robot 100 using homography matrix transformation in particular.

If it is determined that the cleaning robot 100 deviates from a path established based on a touch, the cleaning robot recognizer may re-determine a moving distance and heading angle of the cleaning robot 100.

The user motion detector is to calculate how far the user has been moved from the recognized cleaning robot 100 if the user is moving with the mobile device 300, and may include an image feature extractor, a SLAM algorithm unit for tracking the moving path with the extracted features, and a moving location calculator for calculating a location to which the mobile device is moved.

If the mobile device 300 is moved, the user motion detector may determine a touch point reflecting an extent to which the mobile device 300 has been moved on the map received from the cleaning robot 100. Once the touch point on the map is determined, the mobile device 100 may output the map for the cleaning robot 100 to move to a location corresponding to the touch point, or determine a moving distance and heading angle of the cleaning angle 100 based on the map and control the cleaning robot 100 to move as far as the moving distance at the heading angle. Determining the moving distance and heading angle of the cleaning robot 100 using the map may include determining the same using a current location of the cleaning robot 100 and a location corresponding to the touch point determined on the map.

FIG. 8 is a cleaning system including the cleaning robot 100 configured as described above.

Referring to FIG. 8, the mobile device 300 may freely designate a moving location of the cleaning robot 100 while communicating with the cleaning robot 100 through the third communication unit 350. The cleaning robot 100 may share information about the status of the cleaning robot 100 with the mobile device 300 to provide a self-verification manual for the user through the mobile device 300. The cleaning robot 100 may share information about the cleaning status of the cleaning robot 100 with the mobile device 300 to provide a cleaning process of the cleaning robot 100 for the user through the mobile device 300.

A process of controlling the cleaning robot 100 will now be described.

First, a technology for designating a moving location of the cleaning robot 100 through the mobile device 300 will be described. In an embodiment, a method for controlling the cleaning robot 100 may include displaying an image of the cleaning robot 100 on the second display 320 of the mobile device 300, receiving a touch on the second display 320, and moving the cleaning robot 100 to a location that corresponds to the touch point.

Receiving a touch on the second display 320 may include receiving continuous or discontinuous touches, or single or multiple touches.

Moving the cleaning robot 100 to a location that corresponds to the touch point may include moving the cleaning robot 100 to a location that corresponds to the touch by the shortest path, a straight path, or a curved path.

A technology for designating a moving location of the cleaning robot 100 will now be described with reference to the accompanying drawings. FIGS. 9 and 10 are flow charts illustrating procedures of designating a moving location of the cleaning robot 100 and moving the cleaning robot 100 to the moving location by means of augmentation reality, according to an embodiment of the present disclosure, FIGS. 11A to 11D illustrate examples of designating a moving location of the cleaning robot 100 and moving the cleaning robot 100 to the moving location, according to an embodiment of the present disclosure, FIGS. 12A and 12B illustrate examples of designating a moving location of the cleaning robot 100 and moving the cleaning robot 100 to the moving location, through multi-touches, according to an embodiment of the present disclosure, and FIGS. 13A and 13B illustrate examples of designating a moving location of the cleaning robot 100 and moving the cleaning robot 100 to the moving location, through touching and dragging, according to an embodiment of the present disclosure.

Referring to FIG. 9, to designate a moving location of the cleaning robot 100 through the mobile device 300, the mobile device 300 and the cleaning robot 100 may be connected to each other, in operation 400. They may be connected in a wireless LAN scheme or short-range communication scheme, and the connection state of the mobile device 300 and cleaning robot 100 may be displayed on the second display 320. Overlapping description regarding communication between the mobile device 300 and the cleaning robot 100 will be omitted herein.

Once the mobile device 300 is connected to the cleaning robot 100, the mobile device 300 may collect an image with the third capturing unit 331.

The image collected with the third capturing unit 331 may be displayed on the second display 320 of the mobile device 300. This process is to recognize the cleaning robot 100 by collecting images about the cleaning robot 100, and the image of the cleaning robot 100 may be adjusted to be fitted into the second display 320 of the mobile device 300.

In other words, as shown in FIG. 11A, an image of the cleaning robot 100 may be adjusted such that it may appear on the second display 320 of the mobile device 300.

Once an image is collected by the third capturing unit 331, an image processing procedure for recognizing the cleaning robot 100 is performed, in operation 410. FIG. 10 illustrates the image processing procedure in stages, according to an embodiment of the present disclosure. The image processing procedure may include all operations as shown in FIG. 10, or some operations of FIG. 10 may be omitted depending on design approaches.

Referring to FIG. 10, once an image is collected by the third capturing unit 331, a digitized threshold may be set, in operation 411. The digitized threshold may be pre-stored in the second storage 340, or manually set by the user, or calibrated and set based on a real-time environment according to a pre-stored program.

Once the digitized threshold is set, the image collected in real time by the third capturing unit is captured and imaged, and the resultant information is digitized using the digitized threshold set in operation 411, in operations 412, 413.

Next, with the digitized image information, a candidate area and features of the marker 105 formed on the top of the cleaning robot 100 are detected, in operations 414, 415.

Whether the cleaning robot 100 is present or not, location and direction of the cleaning robot 100 may be recognized with features detected after cancellation of image noise, in operation 416.

After the image processing procedure, it is determined whether the cleaning robot 100 is recognized, in operation 420.

If it is determined that the cleaning robot 100 is not recognized, operations 405 and 410 may be repeatedly performed.

Otherwise, if it is determined that the cleaning robot 100 is recognized, a detection mark may be output onto the second display 320. The user may then know that the cleaning robot 100 is recognized, from the detection mark, in operation 425.

As shown in FIG. 11B, the detection mark may be displayed to overlap an image of the cleaning robot 100. Alternatively, the detection mark may be displayed in a particular point on the second display 320, or the user may know that the cleaning robot 100 is recognized, through the sound output unit 370.

Once the detection mark of the cleaning robot 100 is output, it is determined whether an instruction to designate a location of the cleaning robot 100 is received, in operation 430.

The instruction to designate a location of the cleaning robot 100 may include determining whether a touch is input on the second display 320. A touch by the user may have the form of a single touch as shown in FIG. 11C, multiple touches as shown in FIG. 12A, and touching and dragging as shown in FIG. 13A. For example, an occasion where the instruction to designate a location of the cleaning robot 100 has the form of a single touch will now be described.

If no instruction to designate a location of the cleaning robot 100 is input from the user, operations 405 to 425 may be repeatedly performed.

Otherwise, if the instruction to designate a location of the cleaning robot 100 is input from the user, a process of determining a moving distance and heading angle of the cleaning robot 100 may be performed, in operation 435.

The process of determining a moving distance and heading angle of the cleaning robot 100 may include determining a moving distance and heading angle of the cleaning robot 100 to a location that corresponds to the touch point.

Determining a moving distance and heading angle of the cleaning robot 100 may include determining the moving distance and heading angle of the cleaning robot 100 using homography matrix transformation. However, the process of determining a moving distance and heading angle of the cleaning robot 100 is not limited to the homography matrix transformation. For convenience of explanation, the process of determining a moving distance and heading angle of the cleaning robot will now be described by taking an example of the homography matrix transformation.

Homography is projection transformation by which a 2D plane in a 3D space is transformed to another 2D plane, which may be represented by the following equation 1.

$$s \begin{bmatrix} u \\ v \\ 1 \end{bmatrix} = H \begin{bmatrix} X \\ Y \\ 0 \\ 1 \end{bmatrix} \quad (1)$$

The matrix represented in equation 1 is called homography, and the homography matrix represents relationships between two projected planes. For example, real-world coordinates X, Y may be obtained with projected coordinates u, v.

By applying this to the process of determining the moving distance and heading angle, "real-world coordinates of the cleaning robot 100" and "coordinates of a location corresponding to a touch point" may be obtained with "coordinates of the cleaning robot 100 projected onto the second display 320" and "coordinates of a touch input to the second display 320", respectively, and the moving distance and heading angle of the cleaning robot 100 may be determined using the "real-world coordinates of the cleaning robot 100" and "coordinates of a location corresponding to a touch point".

Once the moving distance and heading angle of the cleaning robot 100 are determined, the mobile device 300 sends the information to the cleaning robot 100 in operation 440, and the cleaning robot 100 then moves the moving distance at the heading angle in operation 445, as shown in FIG. 11D.

In the case multiple touches are input, as shown in FIGS. 12A and 12B, the moving distance and heading angle of the cleaning robot 100 may be determined for the touches according to the same principle as in FIGS. 11A to 11D, and the cleaning robot 100 may move the determined moving distance at the determined angle.

In the case touching and dragging is input, as shown in FIGS. 13A and 13B, the moving distance and heading angle of the cleaning robot 100 may be determined for the touching and dragging according to the same principle as in FIGS. 11A to 11D, and the cleaning robot 100 may move the determined moving distance at the determined angle.

If a new touch is input while the cleaning robot 100 is moving, the moving distance and heading angle of the cleaning robot 100 may be newly determined for the new touch according to the same principle as in FIGS. 11C and 11D, and the cleaning robot 100 may move the newly determined moving distance at the determined angle.

FIG. 14 is a flowchart illustrating a process of designating a location of the cleaning robot 100 including an error correction process for a moving path of the cleaning robot 100, and FIGS. 15A to 15C show examples of the error correction process for moving paths of the cleaning robot 100.

Referring to FIG. 14, operations 400 to 445 are substantially the same as what are described in FIGS. 9 and 10, so the overlapping description will be omitted herein.

For the moving process of the cleaning robot 100, errors may occur due to influences of the user height, an angle of the hand, pixels of the second display 320, etc. If it is determined that an error occurs while the cleaning robot 100 is moving around, operations 435 to 445 are repeatedly performed and the moving distance and heading angle of the cleaning angle 100 may be re-established.

For example, the error correction process may include re-determining the moving distance and heading angle of the cleaning robot 100 by repeatedly performing operations 435 to 445 if it is determined that a moving path (hereinafter, referred to as a first path) of the cleaning robot 100, which is input in advance, has a difference with an actual moving path (referred to as a second path) of the cleaning robot 100. The first and second moving paths may be displayed on the second display 320.

Referring to FIG. 15A, the first path L1 may be designated by a touch input by the user. Referring to FIG. 15B, the cleaning robot 100 may deviate from the first path L1 and then move along the second path L2. If the second path L2 is deviated by a predetermined angle from the first path L1 on the second display 320, the moving distance and heading angle of the cleaning robot 100 may be re-established.

Afterward, the cleaning robot 100 may get on the first path L1 via a third path L3, as shown in FIG. 15C.

FIGS. 16 and 17 are flowcharts illustrating processes of designating a location of the cleaning robot 100 in a case the user needs to designate a location of the cleaning robot 100 while moving the mobile device 300, and FIGS. 18A to 18D illustrate examples of the process of designating a location of the cleaning robot 100 by moving the mobile device 300.

Referring to FIG. 16, operations 400 to 445 are substantially the same as what are described in FIGS. 9 and 10, so the overlapping description will be omitted herein.

Once an instruction to designate a location of the cleaning robot 100 is input, it is determined whether the mobile device 300 has been moved, in operation 455. The instruction to designate a location of the cleaning robot 100 may include a touch input of the user. For example, an occasion where the instruction to designate a location of the cleaning robot 100 is implemented with a touch will now be described.

If it is determined that the mobile device 300 has been moved, the mobile device 300 may receive a map from the cleaning robot 100, in operation 460. The map may include a map composed through the SLAM algorithm. Receiving the map may be performed in operation 400 in which the cleaning robot 100 and the mobile device 300 are connected via a communication network, or in operation 405 in which an image is collected through the third capturing unit 331. Besides, the map may be received at any time considered by an ordinary skilled person in the art.

Once the map is received, an extent of moving of the mobile device 300 may be calculated, in operation 465. The extent of moving of the mobile device 300 may be calculated using a gyro sensor included in the mobile device 300, or calculated by applying information about an image output onto the second display 320 of the mobile device 300 to the image processing procedure.

Calculating the extent of moving of the mobile device 300 may also be performed at any point of time within a range easily considered by the ordinary skilled person in the art, including after or before reception of the map.

Once the extent of moving of the mobile device 300 is calculated, a point where the instruction to designate a location is input from the user may be determined on the map received from the cleaning robot 100, in operation 470.

Taking into account the map received from the cleaning robot 100 in operation 460 and the extent of moving of the mobile device 300 calculated in operation 465, the mobile device 300 may determine the point where a touch is input on the map.

Once the point where a touch is input on the map is determined, the map information is sent to the cleaning robot 100, in operation 475. Upon reception of the map, the cleaning robot 100 may analyze the map, determine a moving distance and heading angle of the cleaning robot 100, and move the moving distance at the heading angle, in operations 480, 445.

Referring to FIG. 17, operations 400 to 470 are the same as those of FIG. 16, so the description will be omitted herein.

Once the point where the touch is input on the map is determined, the mobile device 300 may analyze the map to determine a moving distance and heading angle of the cleaning robot 100, in operation 485.

The mobile device 300 may sent the determined moving distance and heading angle of the cleaning robot 100 to the cleaning robot 100, in operation 490. The cleaning robot 100 may then move the moving distance at the heading angle, in operation 445.

For convenience of explanation, examples of a procedure of designating a location of the cleaning robot 100 including a procedure of moving the mobile device 300 will now be described.

First, referring to FIGS. 18A and 18B, a position of the mobile device 300 may be adjusted such that an image of the cleaning robot 100 appears on the second display 320 of the mobile device 300, and a predetermined detection mark of the cleaning robot 100 may be output on the second display 320 to inform that the cleaning robot 100 has been recognized.

Once the cleaning robot is recognized, as shown in FIG. 18C, the mobile device 300 may be moved and a touch may be input on the second display 320. As described above, the second display 320 may receive continuous or discontinuous touches, or single or multiple touches. In the following description, an occasion where a single touch is input will be taken as an example.

Once a touch is input, the cleaning robot 100 may move to a location corresponding to the touch, as shown in FIG. 18D. The cleaning robot 100 may take a shortest path, a straight path, or a curved path to the location corresponding to the touch.

Thus far, the technology for designating a moving location of the cleaning robot 100 through the mobile device 300 has been described. The procedure of designating a moving location of the cleaning robot 100 is not limited to what are described above, but may include both the process of correcting a moving path error of the cleaning robot 100 and the process of designating the moving location of the cleaning robot 100 by moving the mobile device 300. Various other modifications thereof may also be made by an ordinary skilled person in the art.

A technology for sharing status information between the mobile device 300 and the cleaning robot 100 and a user's self-verification technology will now be described.

In an embodiment, the cleaning robot 100 may share its status information with the mobile device 300, and the status information shared by the mobile device 300 may be displayed on the second display 320. To enable the user's self-verification on the cleaning robot 100, a user's self-verification manual may be provided through the mobile device 300.

FIG. 19 is a flow chart illustrating a procedure of sharing status information of the cleaning robot 100 and providing a self-verification manual using augmentation reality, according to an embodiment of the present disclosure, FIGS. 20 and 21 illustrate occasions where the status of the cleaning robot 100 is shared with the mobile device 100 through the second display 320, and FIGS. 22A to 22C illustrate examples of the process of providing the self-verification manual of the cleaning robot 100 through the display 320 of the mobile device 300.

Referring to FIG. 19, a process of connecting the mobile device 300 and the cleaning robot 100 may be performed first. The mobile device 300 and the cleaning robot 100 may be connected in the WLAN or short-range communication scheme, in operation 500. The description overlapping with what are described above is omitted herein.

Once the mobile device 300 and the cleaning robot 100 are connected, the mobile device 300 may collect surrounding images with the third capturing unit 331 and receive status information of the cleaning robot 100 from the cleaning robot 100, in operation 505.

The surrounding images collected by the third capturing unit 331 may be provided for the image processing procedure to recognize the cleaning robot 100. A process of recognizing the cleaning robot 100 may be performed before a process of analyzing the status information of the cleaning robot 100. However, in other embodiments, the process of recognizing the cleaning robot 100 may be performed after or during the process of analyzing the status information of the cleaning robot 100, or at any time that may be chosen by an ordinary skilled person in the art.

After reception of the status information of the cleaning robot 100, it is determined if an instruction to check information about a particular status has been input from the user, in operation 515.

If the instruction has been input, the information about the status of the cleaning robot 100 may be analyzed. The description overlapping with what are described above with respect to the status information of the cleaning robot 100 will be omitted herein.

If the instruction has not been input, information about the entire status of the cleaning robot 100 received from the cleaning robot 100 is analyzed, in operation 525.

Status information analysis data, which is stored in advance or received through communication with a service center, may be used to analyze the status information of the cleaning robot 100.

After analysis of the status information of the cleaning robot 100, a result of the analysis is output, in operation 530.

The analysis result may be output onto the second display 320, and more particularly, at somewhere around the cleaning robot 100 on the second display 320. In addition to the way of outputting the analysis result onto the second display 320, the analysis result may be output in various ways, such as through the sound output unit 370 equipped in the mobile device 300.

If it is determined from the result of analyzing the status information of the cleaning robot 100 that there is nothing wrong with the cleaning robot 100, a message of the analysis result indicating that there is nothing wrong may be output.

Otherwise, if it is determined from the result of analyzing the status information of the cleaning robot 100 that there is something wrong with the cleaning robot 100, a process of determining whether an instruction to provide a self-verification manual is input, in operation 535.

If the instruction to provide the self-verification manual is not input, the process of providing the self-verification manual is not performed and the entire process may be terminated.

If the instruction to provide the self-verification manual is input, the self-verification manual may be provided, in operation 540. The self-verification manual may be output onto the second display 320 or in other various ways, such as through the sound output unit 370 equipped in the mobile device 300.

If it is determined from the result of analyzing the status information of the cleaning robot 100 that the battery of the cleaning robot 100 runs short, a warning message indicating the shortage of the battery may be output as shown in FIG. 20. If it is determined from the result of analyzing the status information of the cleaning robot 100 that the wheel of the cleaning robot 100 is entwined with threads or something, a warning message indicating the thread-entwined wheel may be output as shown in FIG. 21.

If an instruction to provide a self-verification manual for dealing with the occurrence of the thread-entwining of the wheel is input, a process of providing the self-verification manual may be performed as shown in FIGS. 22A to 22C.

Referring to FIGS. 22A to 22C, the self-verification manual may include outputting a message like "Something is stuck in the wheel. Please disassemble the wheels" as shown in FIG. 22A, a message like "Please loosen the screws in order" as shown in FIG. 22B, or a message like "Please remove stuck strings" as shown in FIG. 22C.

Thus far, a procedure of sharing information of the status of the cleaning robot 100 and providing a self-verification manual by means of augmentation reality has been described. The procedure is not limited thereto, but various modifications to the procedure may be made by an ordinary skilled person in the art.

A process of providing and checking a cleaning status of the cleaning robot 100 will now be described.

In an embodiment, the process of providing and checking a cleaning status of the cleaning robot 100 may include sharing the cleaning status of the cleaning robot 100 between the cleaning robot 100 and the mobile device 300, and outputting the cleaning status of the cleaning robot 100 through the mobile device 100. Outputting the cleaning status may include displaying the cleaning status on the second display 320 of the mobile device 100, in which case the second display 320 may display a moving path, cleaning area, or area in need of cleaning of the cleaning robot 100.

FIG. 23 is a flow chart illustrating a procedure of providing and checking a cleaning status of the cleaning robot 100 using augmentation reality, according to an embodiment of the present disclosure, and FIG. 24 illustrates an example of providing and checking a cleaning status, according to an embodiment of the present disclosure.

Referring to FIG. 23, a process of connecting the mobile device 300 and the cleaning robot 100 may be performed first, in operation 600, and the description overlapping with what are described above will be omitted herein.

Once the mobile device 300 and the cleaning robot 100 are connected, the mobile device 300 may collect surrounding images with the third capturing unit 331 and at the same time, receive data about a cleaning status of the cleaning robot 100, in operation 610. The data about a cleaning status of the cleaning robot 100 may be obtained from data about a moving path of the cleaning robot 100.

After the process of collecting images through the third capturing unit 331 and receiving the cleaning status information by the mobile device 300, a process of recognizing the cleaning device 100 and analyzing the cleaning status may be performed, in operation 620.

The cleaning robot 100 may be recognized by applying the collected images for the process of recognizing the cleaning robot 100. Recognizing the cleaning robot 100 and analyzing the cleaning status may be performed at the same time, or the former process may be performed before or after the latter process. The timing of the processes may be freely chosen by an ordinary skilled person in the art. Details related to recognition of the cleaning robot 100 are substantially the same as what are described in FIGS. 9 and 10, so the overlapping description will be omitted herein.

The process of analyzing the cleaning status may include analyzing a moving path of the cleaning robot 100. The mobile device 300 may determine the moving path of the cleaning robot 100 as a cleaning area.

After the process of recognizing the cleaning robot 100 and analyzing the cleaning status, a result of analyzing the cleaning status may be output. Outputting the result of analyzing the cleaning status may include displaying the cleaning status on the second display 320. The moving path, cleaning area, or area in need of cleaning of the cleaning robot 100 may be displayed on the second display 320.

Referring to FIG. 24, the cleaning robot 100 may be recognized by adjusting an image of the cleaning robot 100 to appear in the second display 320 of the mobile device 300. Once the cleaning robot 100 is recognized, a detection mark of the cleaning robot 100 may be output onto the second display 320.

When a touch is input on the second display 320, the cleaning robot 100 may move to a location corresponding to the touch point, and while the cleaning robot 100 is moving around, the moving path of the cleaning robot 100 may be displayed on the second display 320 of the mobile device 300. From the moving path of the cleaning robot 100 displayed on the second display 320, the cleaning status of the cleaning robot 100 may be checked. That is, the path along which the cleaning robot 100 has passed may be determined as a cleaning area of the cleaning robot 100.

As such, the cleaning robot 100, the mobile device 300, a technology for designating a moving location of the cleaning robot 100 by means of the mobile device 300, a technology for sharing status information of the cleaning robot 100 with the mobile device 300, a self-verification technology, and a technology for sharing and checking cleaning status between the cleaning robot 100 and the mobile device 300 have thus far been described. Several embodiments have been described, but a person of ordinary skill in the art will understand and appreciate that various modifications can be made without departing the scope of the present disclosure. Thus, it will be apparent to those ordinary skilled in the art that the true scope of technical protection is only defined by the following claims.

The invention claimed is:

1. A mobile device comprising:
 a capturing unit;
 a display configured to display an image of a cleaning robot obtained from the capturing unit and receiving a touch; and
 a controller configured to:
  determine whether the mobile device has been moved between the displaying of the image of the cleaning robot and the receiving of the received touch,
  control the cleaning robot to move to a location that corresponds to the received touch in response to determining that the mobile device has not been moved, and
  in response to determining that the mobile device has been moved, determine an extent of moving the mobile device to determine a location information of the received touch on a map received from the cleaning robot, and control the cleaning robot to move to a location that corresponds to the received touch by outputting the map with the location information of the received touch to the cleaning robot added or by transmitting a data signal about a moving distance and a heading angle of the cleaning robot to the cleaning robot.

2. The mobile device of claim 1, wherein:
 the display is configured to receive continuous or discontinuous touches, or a single touch or multiple touches, and
 the controller is configured to, when receiving the touch from the display, control the cleaning robot to take a straight or curved path to the location that corresponds to the received touch.

3. The mobile device of claim 1, wherein the controller is configured to:
 determine the moving distance and the heading angle of the cleaning robot using a homography matrix transformation, and
 in response to determining that the cleaning robot is deviated from a path set based on the touch, re-determine the moving distance and the heading angle of the cleaning robot.

4. The mobile device of claim 1, wherein the controller is configured to:
 determine the moving distance and the heading angle of the cleaning robot based on a determined current location of the cleaning robot and a touch point on the map, and
 control the cleaning robot to move the moving distance at the heading angle.

5. The mobile device of claim 1, wherein:
 the cleaning robot includes a marker, and
 the controller is configured to:
  digitize image information of the marker obtained from the capturing unit,
  recognize the marker by detecting a candidate area of the marker from the digitized image information, and
  determine that the cleaning robot is recognized once the marker is recognized.

6. The mobile device of claim 1, wherein:
 the display is configured to display status information of the cleaning robot,
 the status information comprises at least one selected from among information about battery charging state of the cleaning robot, information about whether there is dust or dirt, information about a dust bin of the cleaning robot, information about a caster, information about a fall sensor, and information about side brushes.

7. The mobile device of claim 6, wherein the display is configured to display the status information around an image of the cleaning robot displayed on the display, or at a predetermined spot on the display.

8. The mobile device of claim 6, further comprising:
 a sound output unit for outputting the status information of the cleaning robot;
 a communication unit for communicating with an external device including the cleaning robot; and
 a storage for storing data of the status information of the cleaning robot obtained from a service center.

9. A cleaning robot comprising:
 a main unit;
 a marker arranged on a top of the main unit, wherein the marker is displayed on a display of an external device including a mobile device;
 a communication unit for communicating with the external device; and
 a controller configured to:
  receive a map or a data signal about a moving distance and a heading angle for a location that corresponds to a touch point when a touch is input to the display, and
  control the cleaning robot using the map or the data signal, wherein the map and the data signal include a location information of the touch point reflected an extent of moving of the external device.

10. A method for controlling a cleaning robot, the method comprising:
   displaying an image of the cleaning robot on a display of a mobile device;
   receiving a touch through the display;
   determining whether the mobile device has been moved between the displaying of the image of the cleaning robot and the receiving of the touch;
   moving the cleaning robot to a location that corresponds to a point of the touch in response to determining that the mobile device has not been moved; and
   in response to determining that the mobile device has not been moved, receiving a map from the cleaning robot, and determining an extent of moving the mobile device to determine a location information of the received touch on the map, and moving the cleaning robot to a location that corresponds to a point of the touch by outputting the map with the location information of the received touch to the cleaning robot added or by transmitting a data signal about a moving distance and a heading angle of the cleaning robot to the cleaning robot.

11. The method of claim 10, wherein moving the cleaning robot to a location that corresponds to a point of the touch comprises:
   once at least one of continuous touches, discontinuous touches, a single touch, and multi-touches is input to the display of the mobile device, receiving a touch signal from the mobile device, and
   moving the cleaning robot along a straight or curved path to the location that corresponds to the point of the touch.

12. The method of claim 10, wherein the moving distance and the heading angle of the cleaning robot are determined using a homography matrix transformation.

13. The method of claim 12, wherein determining the moving distance and the heading angle of the cleaning robot comprises determining the moving distance and the heading angle of the cleaning robot using real-world coordinates of the cleaning robot and coordinates of a location that corresponds to a touch point.

14. The method of claim 10, further comprising:
   re-determining a moving distance and heading angle of the cleaning robot, if it is determined that the cleaning robot deviates from a path established based on the touch.

15. The method of claim 10, further comprising:
   outputting a detection mark through the display indicating that the cleaning robot has been recognized.

16. The method of claim 10, further comprising:
   displaying status information of the cleaning robot on the display; and
   wherein the status information comprises at least one selected from among information about battery charging state of the cleaning robot, information about whether there is dust or dirt, information about a dust bin of the cleaning robot, information about a caster, information about a fall sensor, and information about side brushes.

17. The method of claim 10, further comprising:
   displaying cleaning status of the cleaning robot on the display, wherein displaying cleaning status of the cleaning robot on the display comprises displaying at least one of a moving path, a cleaning region or a region in need of cleaning of the cleaning robot.

* * * * *